US011200624B1

(12) United States Patent
McCune et al.

(10) Patent No.: US 11,200,624 B1
(45) Date of Patent: Dec. 14, 2021

(54) ACCOUNTING SOFTWARE HAVING CASH BASIS AND ACCRUAL BASIS LEDGERS

(71) Applicant: Patriot Software, LLC, Canton, OH (US)

(72) Inventors: Asher David McCune, Canton, OH (US); Michael John Streb, Canton, OH (US); Jacilyn Sylvia White, Canton, OH (US)

(73) Assignee: Patriot Software, LLC, Canton, OH (US)

( * ) Notice: Subject to any disclaimer, the term of this patent is extended or adjusted under 35 U.S.C. 154(b) by 253 days.

(21) Appl. No.: 16/195,177

(22) Filed: Nov. 19, 2018

Related U.S. Application Data

(60) Provisional application No. 62/588,478, filed on Nov. 20, 2017.

(51) Int. Cl.
*G06Q 10/00* (2012.01)
*G06Q 40/00* (2012.01)

(52) U.S. Cl.
CPC .................................. *G06Q 40/12* (2013.12)

(58) Field of Classification Search
CPC ............................ G06Q 40/12; G06Q 10/287
USPC ...................................................... 705/16, 30
See application file for complete search history.

(56) References Cited

U.S. PATENT DOCUMENTS

| | | | | |
|---|---|---|---|---|
| 5,117,356 A | * | 5/1992 | Marks | G06Q 40/12 705/30 |
| 5,193,055 A | * | 3/1993 | Brown | G06Q 20/00 705/33 |
| 5,335,169 A | * | 8/1994 | Chong | G06Q 40/02 705/31 |
| 6,330,545 B1 | | 12/2001 | Suh | |
| 2002/0123949 A1 | | 9/2002 | VanLeeuwen | |
| 2002/0174006 A1 | * | 11/2002 | Rugge | G06Q 40/025 705/36 R |
| 2002/0188558 A1 | * | 12/2002 | Morimoto | G06Q 40/00 705/39 |
| 2003/0139985 A1 | * | 7/2003 | Hollar | G06Q 40/02 705/30 |
| 2006/0106687 A1 | * | 5/2006 | Lal | G06Q 20/381 705/30 |

* cited by examiner

*Primary Examiner* — Rokib Masud
(74) *Attorney, Agent, or Firm* — Sand, Sebolt & Wernow Co., LPA

(57) ABSTRACT

A system and method that provides for selectively displaying accounting data that is recorded into and independently maintained in both cash basis format and accrual basis format. The dual ledger aspect of the system enables the present disclosure to eliminate the need for modifying entries when the customer switches their viewing preference from the cash basis model to the accrual basis model, or vice versa. As such, the system is able to simplify the process of retrieving accounting data in either basis which has the benefit of increasing computer functionality by reducing processing requirements and increasing signal throughput to thereby provide faster delivery of the information to the customer.

25 Claims, 34 Drawing Sheets

ACCOUNTING SOFTWARE HAVING CASH BASIS AND ACCRUAL BASIS LEDGERS

CROSS REFERENCE TO RELATED APPLICATION

This application claims the benefit of U.S. Provisional Application Ser. No. 62/588,478, filed on Nov. 20, 2018; the disclosure of which is incorporated herein by reference.

TECHNICAL FIELD

The present disclosure relates to computer systems implementing accounting software. More particularly, an accounting software that enables a user to toggle between different basis model views (i.e., cash basis or accrual basis) by tracking accounting entries in separate ledgers, while presenting only one ledger for viewing at a time.

BACKGROUND

Background Information

Accounting is the system to track and review the financial performance of a business or entity. Double entry accounting provides that every entry into the accounting system requires two entries in different accounts that offset each other, thereby keeping the books in balance. One basis for accounting is a cash basis and a second basis is an accrual basis. Using a cash basis, revenue is recognized when the funds are actually received and expenses are recognized when payments are actually made. Using an accrual basis, revenue is recognized once an item or service is sold, creating a receivable that will be received in the future and expenses are recognized when they are incurred, creating a payable that will be paid at a point in the future. Modern tax code allows certain businesses to use cash basis accounting and other businesses to use accrual based accounting. The use of either accrual or cash basis accounting can have desirable or undesirable tax consequences as the reportable income can change depending on the basis selected. In addition, certain creditors may desire to see financial statement using cash basis accounting and other creditors may desire to see financial performance using accrual based accounting. However, accurately switching the basis of accounting and determining the effects of switching the basis of accounting for a given company has been a challenging task.

One exemplary accounting system has been disclosed in U. S. Patent Application Publication No. 2006/0106687 (the '687 publication). The '687 publication relates to a method of automatically converting from accrual based accounting to cash based accounting using a computer. The method may include reviewing an entry in a general ledger, determining whether an entry in the general ledger is for a transaction between general ledger accounts that are treated differently in an accrual based accounting and cash based accounting, for an entry determined to be between general ledger accounts that are treated differently in accrual based accounting and cash based accounting, calculating a modifying entry to convert the entry from accrual basis accounting to cash basis accounting, applying the calculated modification entry to the entry, and creating a modified balance sheet and a modified income statement based on the modified entry.

The use of modifying entries in the '687 publication creates an amount of work that can sometimes be tedious and burdensome and may sometimes lead to errors, inasmuch as a single ledger is kept and entries must be calculated in modified manners in order to convert between accrual basis and cash basis accounting.

SUMMARY

Issues continue to exist with computer related accounting systems, such as what is disclosed in the '687 publication. Namely, the '687 publication creates a computer centric or internet centric problem for calculating modifying entries that increasing processing requirements of the host computers. Thus, a need continues to exist for an improved accounting system to this computer centric or internet centric problem that enables operators or users to convert from accrual based accounting to cash basis accounting. The present disclosure addresses these and other issues.

Some of the issues that continue to exist with the '687 publication are that it requires computer processing to (i) determine whether an entry is for a transaction between ledger accounts that are treated differently in an accrual basis accounting system and a cash basis accounting system, and if needed, (ii) calculate a modifying entry to convert the entry from accrual basis accounting to cash basis accounting (iii) apply the calculated modification entry to the entry, and (iv) create a modified balance sheet and modified income statement based on the modified entry. Thus, additional pseudo code or other processing parameters are required in the program to evaluate the different ledger transactions. The present disclosure addresses these computer processing pitfalls and enables a computer program to run more efficiently and quickly, thereby improving overall computing, processing and speed by eliminating the need to (i) determine whether an entry is for a transaction between ledger accounts that are treated differently in an accrual basis accounting system and a cash basis accounting system (ii) calculate a modifying entry to convert the entry from accrual basis accounting to cash basis accounting (iii) apply the calculated modification entry to the entry, and (iv) create a modified balance sheet and modified income statement based on the modified entry.

Further, the present disclosure eliminates the need for any creation of table entries that were modified. As one having ordinary skill in the art understands, whenever a modifying entry is created, it must be placed into a phantom account payment system so that it can be accounted for during the modification. A dual ledger system that tracks transactions using the system of the present disclosure eliminates the need for a table of phantom entries. Additionally, some aspects of the present disclosure may further improve computer functionality, thus improving upon a computer centric problem to reduce processing requirements that would be ordinarily present in the computer program of the '687 publication which, when switching between cash basis statements and accrual basis statements using a drop down selection box, require storing the calculated changes of modification entries in a temporary location without modifying the underlying entries. Thus, the present disclosure is able to eliminate extra processing and storage requirements that would ordinarily be necessary to effectuate the calculations of the '687 publication. Thus, stated otherwise, while the '687 publication may effectuate the switching between cash basis and accrual basis accounting methods, the system of the present disclosure is able to perform a similar function in an improved way that eliminates computer processing design challenges present in the '687 publication. For example, the computer centric or internet centric problem of increased processing based on calculations which further leads to increased power consumption and an increase in processing time are all reduced by providing a new and improved calculation method of simultaneously maintaining dual ledgers and eliminating the need for modifying entries.

Further, while it may initially be envisioned that maintaining two ledgers (i.e., the dual ledger process) may require more computing and processing power than modifying the entries would, this is not necessarily the case. Because the nature of computing systems is to store an entry once and retrieve it many times, accounting systems retrieve information from storage far more often than they store information. By eliminating the need for any modifying entries when reading the ledger entries from memory, the present disclosure improves the execution time of retrieving the ledger entries and thereby improves overall system performance. Further still, by maintaining independent and discrete ledgers, there is less likelihood for error than the use of a modifying entry which bridges between each accounting basis. Thus, there are more checks and balances that are required in generating software or program code to effectuate the modifying entries than in maintaining two independent and separate ledgers.

In one aspect, one embodiment of the present disclosure may provide at least one non-transitory computer readable storage medium having instructions encoded thereon that, when executed by one or more processors, implement accounting operations to record journal entries in two different ledgers while only displaying one ledger at a time but allowing the operator to selectively toggle between the two ledgers. In one example, the operations may include receiving user input into an interface. Then, recording the entries into a first ledger, which may be a cash basis accounting ledger and recording the entries into a second ledger, which may be an accrual basis accounting ledger. Then, displaying one or the other of those ledgers in financial reports. A toggle, switch, or drop down menu is provided which enables the user to selectively switch between a cash basis view and an accrual basis view when viewing financial reports without the need for modifying entries inasmuch as the system was tracking and calculating two complete ledgers, while only displaying one to the user.

In another aspect, an exemplary embodiment of the present disclosure may provide a method for switching accounting bases for accounting data viewed at a first terminal linked with a second terminal, both terminals having memory and a processor, the method comprising: receiving transactional data in the second terminal; recording the transactional data twice, wherein the transactional data is recorded in a cash basis first ledger and an accrual basis second ledger; responding to a first execution call of the first terminal by providing the first terminal the accounting data in a cash basis format from the first ledger; transferring, from the second terminal, the accounting data in a cash basis format from the first ledger; responding to a second execution call of the first terminal by providing the first terminal the accounting data in an accrual basis format from the second ledger; transferring, from the second terminal, the accounting data in an accrual basis format from the second ledger; wherein the first ledger and the second ledger are maintained independently such that each ledger contains the transactional data and no modifying entries are needed. In one particular embodiment, the accounting data viewed at the first terminal is remotely stored on a cloud server physically distinct from the first terminal and the second terminal. However, it is possible that the accounting data be stored at the second terminal or on the terminal itself. This exemplary embodiment or another exemplary embodiment may further provide responding to the first execution call generated in response to a virtual toggle switch being actuated at the first terminal. This exemplary embodiment or another exemplary embodiment may further provide responding to the second execution call generated in response to the virtual toggle switch being actuated in an opposite manner than what generated the first execution call. This exemplary embodiment or another exemplary embodiment may further provide generating entries in the first ledger and in the second ledger at the second terminal in response to a request from the first terminal that a new transaction be created. This exemplary embodiment or another exemplary embodiment may further provide responding to a transaction being updated at the first terminal by updating transactional data at the second terminal independently in both the first ledger and the second ledger. This exemplary embodiment or another exemplary embodiment may further provide responding, by the second terminal, to the first execution call by displaying accounting data in cash basis format in the first terminal; and responding, by the second terminal, to the second execution call by displaying accounting data in accrual basis format in the first terminal. This exemplary embodiment or another exemplary embodiment may further provide executing calculations, at the second terminal, for accounting entries entered at the first terminal; responding, by the second terminal, to the first execution call by only displaying accounting data in cash basis format in the first terminal and not displaying the accounting data in accrual basis format in the first terminal at the same time. This exemplary embodiment or another exemplary embodiment may further provide responding, by the second terminal, to a switching preference entered at the first terminal, wherein the switching preference alters how the accounting data is viewed in the first terminal, and wherein switching preferences has no effect on the accounting data entered into the independent first and second ledgers.

In yet another aspect, an exemplary embodiment of the present disclosure may provide a software-as-a-service ("SaaS") system comprising: a first terminal in a computing environment associated with a customer; a second terminal in a computing environment associated with a service provider, wherein the second terminal is network linked or internet linked with the first terminal; a cash basis accounting first ledger hosted by the second terminal that is selectively viewable at the first terminal; an accrual basis accounting second ledger hosted by the second terminal that is selectively viewable at the first terminal, wherein view selection of the first ledger and the second ledger is accomplished by a toggle switch at the first terminal; and wherein the first ledger and the second ledger are maintained independently such that each ledger contains appropriate transactional data and no modifying entries are needed when toggling the view selection. This exemplary embodiment or another exemplary embodiment may further provide an execution call generated at the first terminal in response to the customer actuating the toggle switch; wherein the execution call switches a display in the first terminal either (i) from the first ledger to the second ledger, or (ii) from the second ledger to the first ledger; wherein independent maintenance of the first ledger and the second ledger enable the execution call to switch between ledger displays without the need for modifying entries to be generated. This exemplary embodiment or another exemplary embodiment may further provide a transaction entered at the first terminal that is sent across the network link or the internet link to the second terminal; accounting data generated at the second terminal corresponding to the transaction recorded independently into both the first ledger and the second ledger; and a storage medium to host the accounting data in the first ledger and the second ledger. This exemplary embodiment or another exemplary embodiment may further provide wherein the storage medium is in the computing environment of the second terminal wherein the storage medium is on an internet-based cloud storage system. This exemplary embodiment or another exemplary embodiment may further provide a warning generated to alert the customer at the first terminal that attempting to make entries that use accrual accounts in the first ledger will necessitate the use of modified cash basis in place of cash basis. This exemplary embodiment or another exemplary embodiment may further provide logic to eliminate the viewing preference associated with cash basis and only display a modified cash basis option and an accrual basis option in response to the customer ignoring the warning. This exemplary embodiment or another exemplary embodiment may further provide reclassifying the first ledger to be a modified cash basis ledger after the viewing preference associated with the cash basis first ledger was eliminated.

In yet another aspect, an exemplary embodiment of the present disclosure may provide a method for solving a computer centric problem by eliminating modifying entries when switching between a cash basis accounting ledger and an accrual basis accounting ledger, the method comprising: receiving transactional accounting data at a second terminal input from a first terminal remote from the second terminal; evaluating the transactional accounting data at a second terminal and determining the appropriate cash basis entries and accrual basis entries to be recorded; recording the transactional accounting data at the second terminal by recording the transactional accounting data into a cash basis first ledger and an accrual basis second ledger; maintaining, independently, the first ledger and the second ledger at the second terminal; updating, independently, the first ledger and the second ledger at the second terminal in response to subsequent accounting transactions entered from the first terminal; responding to a first selection from the first terminal to switch a viewing preference of the transactional accounting data displayed in the first terminal from the first ledger to the second ledger; and responding to a second selection from the first terminal to switch the viewing preference of the transactional accounting data displayed in the first terminal from the second ledger to the first ledger; wherein when the viewing preference is switched at the first terminal, no modifying entries are calculated to effectuate the switch.

In yet another aspect, an exemplary embodiment of the present disclosure may provide a method comprising: receiving transactional accounting data input at a terminal; recording the transactional accounting data independently into a cash basis first ledger and an accrual basis second ledger at the terminal; maintaining, independently, the first ledger and the second ledger at the terminal; updating, independently, the first ledger and the second ledger at the terminal in response to a subsequent accounting transaction input at the terminal; responding to a first selection at the terminal to switch a viewing preference of the transactional accounting data displayed at the terminal from the first ledger to the second ledger; and responding to a second selection at the terminal to switch the viewing preference of the transactional accounting data displayed at the terminal from the second ledger to the first ledger; wherein when the viewing preference is switched at the terminal, no modifying entries are calculated to effectuate the switch. This exemplary embodiment or another exemplary embodiment may further provide toggling, selectively, a virtual toggle switch between the first selection and the second selection at the terminal. This exemplary embodiment or another exemplary embodiment may further provide displaying a cash basis accounting statement at the terminal in response to the first selection toggled by the virtual toggle switch; and displaying an accrual basis accounting statement at the terminal in response to the second selection toggle by the virtual toggle switch. This exemplary embodiment or another exemplary embodiment may further provide displaying accounting data in only cash basis format or accrual basis format at the terminal at one time and not displaying the other basis of accounting data in cash basis format or accrual basis format at the terminal at the same time. This exemplary embodiment or another exemplary embodiment may further provide generating a warning in response to a request to enter a transaction that uses accrual entries in the first ledger; and reclassifying the first ledger to be a modified cash basis ledger in response to a command from the terminal to ignore the warning. This exemplary embodiment or another exemplary embodiment may further provide responding, by the second terminal, to transactional data entered at the first terminal and stored on a remote cloud server. This exemplary embodiment or another exemplary embodiment may further provide sending a warning from the second terminal to the first terminal in response to a request to enter a transaction that uses accrual entries in the cash basis ledger; and subsequent to the first terminal ignoring the warning, removing a restriction that prevents accrual accounts from being used in the first ledger.

In yet another aspect, an exemplary system and method provides for selectively displaying accounting data that is continuously modified and independently maintained in cash basis format and accrual basis format. A terminal associated with a service provider may pull transactional data from a cloud based storage server to perform dual ledger calculations for displaying the accounting data in response to a selection of a customer at their own respective terminal or computer. The dual ledger aspect of the system enables the present disclosure to eliminate the need for modifying entries when the customer switch its viewing preference from the cash basis model to the accrual basis model, or vice versa. As such, the system is able to increase computer functionality by reducing processing requirements and increasing signal throughputs to thereby provide faster delivery of information in either basis display format to the customer, that what was previously required in other accounting programs, such as what was provided by the '687 publication.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One having ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1A:
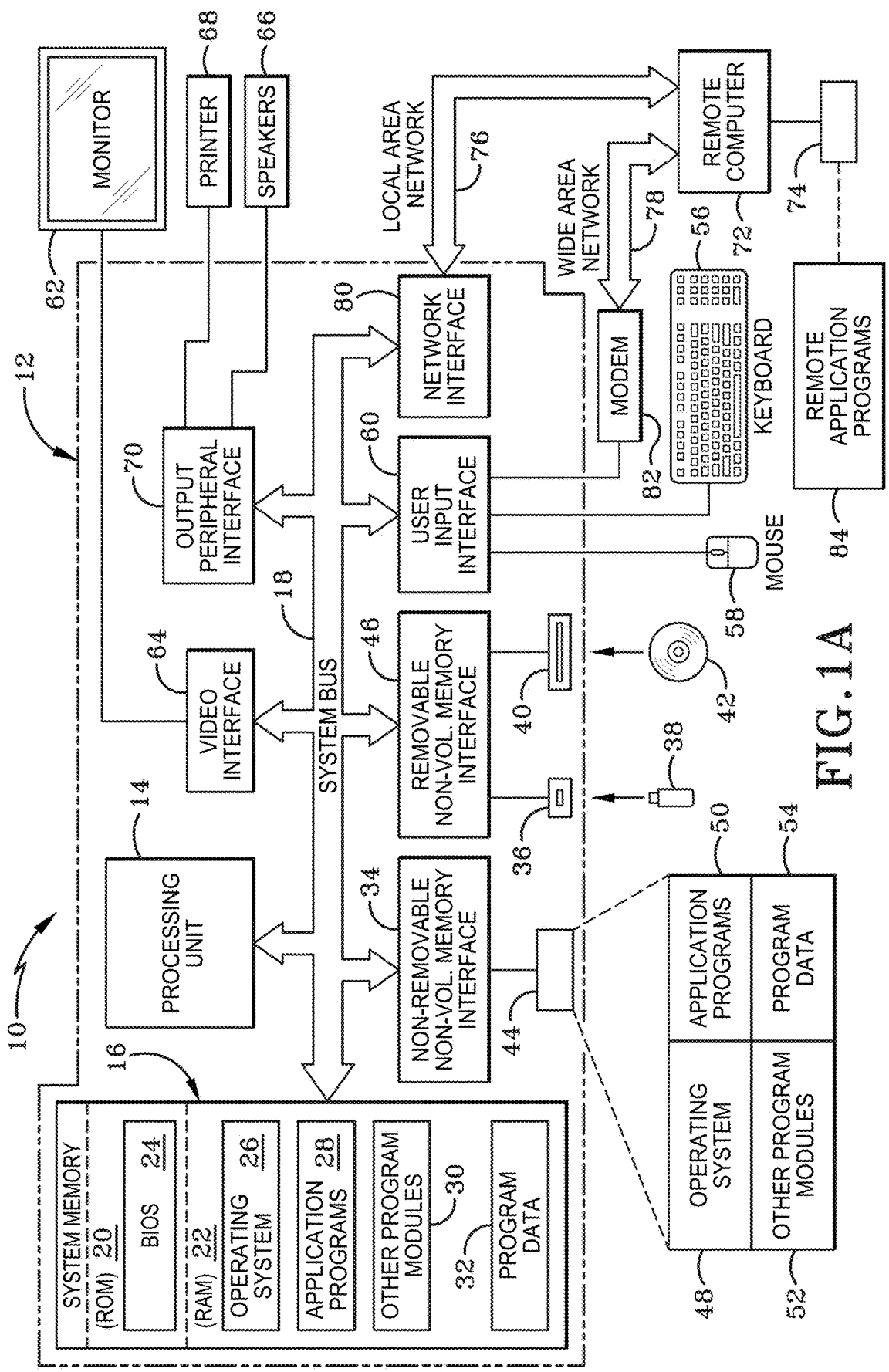
FIG. 1A is a schematic view of an exemplary computing environment implementing aspects of an accounting software in accordance with the present disclosure.

FIG. 1 depicts an exemplary computing system environment 10 which is constructed to execute instructions and interface with an operator. The computing system environment 10 includes a computer or apparatus on which the claimed method and programmed memory may be implemented. The computing system environment 10 is only one example of a suitable computing environment and is not intended to suggest any limitation as to the scope of use or functionality of the invention. Neither should the computing environment 10 be interpreted as having any dependency or requirement relating to any one or combination of components illustrated in the exemplary operating environment 10.

The claimed methods, programmed memory and apparatus are operational with numerous other general purpose or spatial purpose computing system environments or configurations. Examples of well-known computing systems, environments, and/or configurations that may be suitable for use with the invention include, but are not limited to, personal computers, server computers, hand-held or laptop devices, smart phones (such as an Apple iPhone or a Samsung Galaxy or the like), multiprocessor systems, microprocessor-based systems, set top boxes, programmable consumer electronics, network PCs, minicomputers, mainframe computers, distributed computing environments that include any of the above systems or devices, and the like.

The claimed methods, apparatus and programmed memory may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the claimed methods, apparatus and programmed memory includes a general purpose computing device in the form of a computer 12 (which may also be referred to as a terminal). Components of computer 12 may include, but are not limited to, a processing unit 14, a system memory 16, and a system bus 18 that couples various system components including the system memory to the processing unit 14. The system bus 18 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 12 typically includes a variety of computer readable media. Computer readable media can be any available media that can be accessed by computer 12 and includes both volatile and nonvolatile media, transitory and non-transitory, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. This may also include non-transitory computer readable storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 16 includes computer storage media in the form of volatile and/or nonvolatile memory such as read only memory (ROM) 20 and random access memory (RAM) 22. A basic input/output system 24 (BIOS), including the basic routines that help to transfer information between elements within computer 12, such as during start-up, is typically stored in ROM 20. RAM 22 typically includes data and/or program modules that are immediately accessible to and/or presently being operated on by processing unit 14. By way of example, and not limitation, FIG. 1 illustrates operating system 26, application programs 28, other program modules 30, and program data 32.

The computer 12 may also include other removable/non-removable, volatile/nonvolatile computer storage media. By way of example only, FIG. 1 illustrates a hard disk drive interface 34 to memory 44 that reads from or writes to non-removable, nonvolatile magnetic media, a drive 36 that reads from or writes to a removable, nonvolatile magnetic disk or USB flash drive 38, and an optical disk drive 40 that reads from or writes to a removable, nonvolatile optical disk 42 such as a CD ROM or other optical media. Other removable/non-removable, volatile/nonvolatile computer storage media that can be used in the exemplary operating environment include, but are not limited to, magnetic tape cassettes, USB thumb drives, USB memory sticks, SD cards, flash memory cards, digital versatile disks, digital video tape, solid state RAM, solid state ROM, and the like. The memory or hard disk drive 44 is typically connected to the system bus 18 through a non-removable memory interface such as interface 34, and drive 36 and optical disk drive 40 are typically connected to the system bus 18 by a memory interface, such as interface 46.

The drives and their associated computer storage media discussed above and illustrated in FIG. 1, provide storage of computer readable instructions, data structures, program modules and other data for the computer 12. In FIG. 1, for example, hard disk drive 44 is illustrated as storing operating system 48, application programs 50, other program modules 52, and program data 54. Note that these components can either be the same as or different from operating system 26, application programs 28, other program modules 30, and program data 32. Operating system 48, application programs 50, other program modules 52, and program data 54 are given different numbers here to illustrate that, at a minimum, they are different copies.

A user may enter commands and information into the computer 12 through input devices such as a keyboard 56 and pointing device 58, commonly referred to as a mouse, trackball, touch pad or touch screen. Other input devices (not shown) may include a touchscreen, buttons, individual keys, microphone, joystick, game pad, satellite dish, scanner, or the like. These and other input devices are often connected to the processing unit 14 through a user input interface 60 that is coupled to the system bus 18, but may be connected by other interface and bus structures, such as a parallel port, game port or a universal serial bus (USB). A monitor 62 or other type of display device is also connected to the system bus 18 via an interface, such as a video interface 64. In addition to the monitor 62, computers may also include other peripheral output devices such as speakers 66 and printer 68, which may be connected through an output peripheral interface 70.

The computer 12 may operate in a networked environment using logical connections to one or more remote computers, such as a remote computer 72 (which may be considered a second terminal). The remote computer 72 may be a personal computer, a server, a router, a network PC, a peer device, a smartphone or other common network node, and typically includes many or all of the elements described above relative to the computer 12, although only a memory storage device 74 has been illustrated in FIG. 1. The logical connections depicted in FIG. 1 include a local area network (LAN) 76 and a wide area network (WAN) 78, but may also include other networks. Such networking environments are commonplace in offices, enterprise-wide computer networks, intranets and the Internet.

When used in a LAN networking environment, the computer 12 is connected to the LAN 76 through a network interface or adapter 80. When used in a WAN networking environment, the computer 12 typically includes a modem 82 or other means for establishing communications over the WAN 78, such as the Internet. The modem 82, which may be internal or external, may be connected to the system bus 18 via the user input interface 60, or other appropriate mechanism. In a networked environment, program modules depicted relative to the computer 12, or portions thereof, may be stored in the remote memory storage device. By way of example, and not limitation, FIG. 1 illustrates remote application programs 84 as residing on memory device 74. It will be appreciated that the network connections shown are exemplary and other means of establishing a communications link between the computers may be used.

Now that computing environment 10 has been described, reference is made to the accounting system, method, and article of manufacture for enabling accounting principles to be performed of the present disclosure, to which the computing environment 10 helps implement.

Figure 1B:
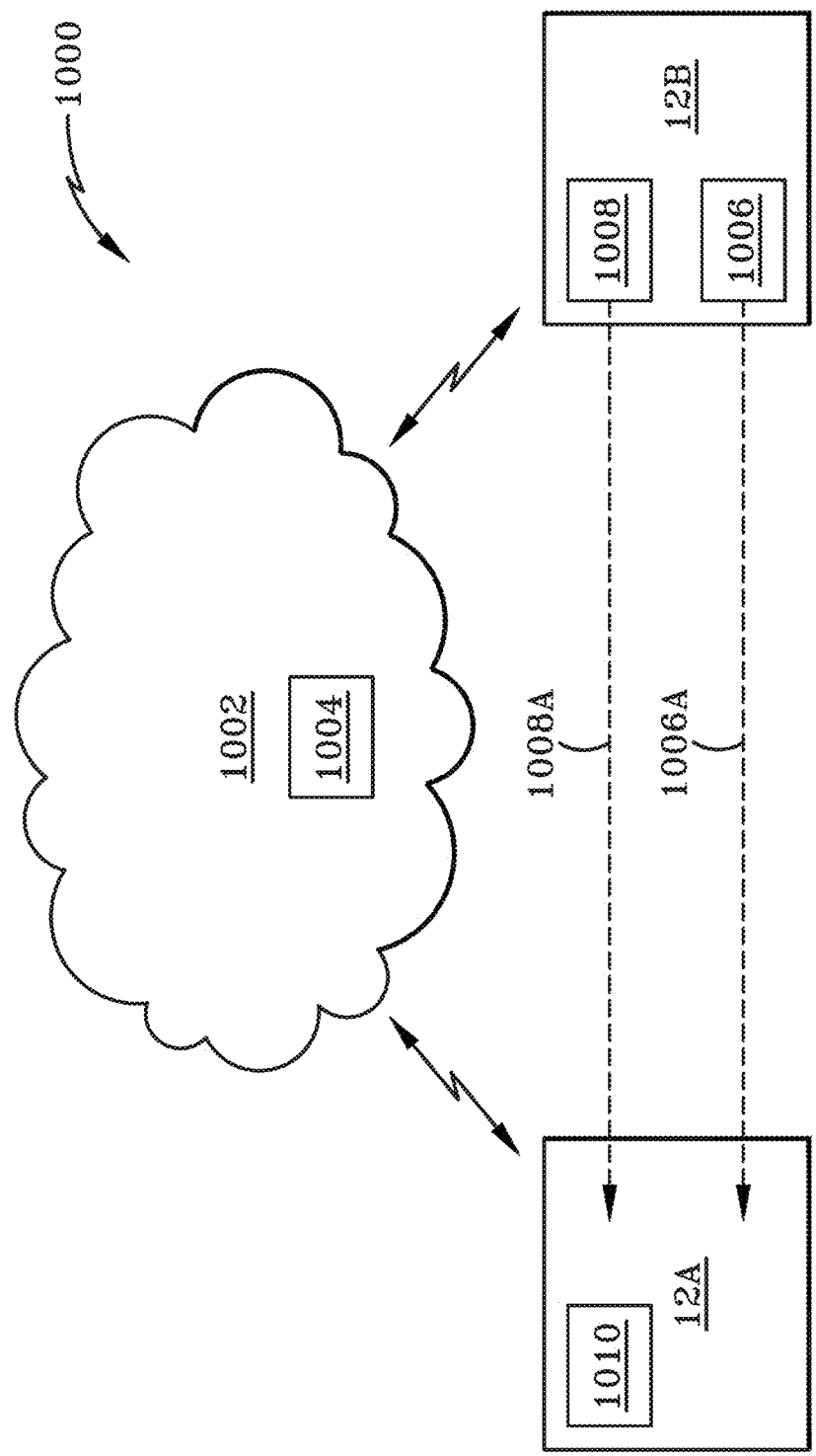
FIG. 1B is a schematic view of a software-as-a-service accounting system according to an exemplary aspect of the present disclosure.

FIG. 1B depicts a software-as-a-service (SaaS) system generally at 1000. The system 1000 may include a first computer or terminal 12A and a second computer or terminal 12B linked together via a network connection 1002. The accounting software depicted in the present disclosure may be accessed by an operator/customer via the Internet or World Wide Web implemented by computing environment 10 or computer 12, such that the accounting software is a software-as-a-service ("SaaS"). The SaaS model presented herein may include a first computing environment 10 and a second computing environment 10. As understood in SaaS architectures and methodologies, the computers 12A, 12B may be referred to as terminals. For example, the SaaS system 1000 of the present disclosure may include a first terminal and a second terminal. The first terminal may be a first computer and the second terminal may be another computer. The first terminal and the second terminal may be linked or networked together via the Internet or world wide web (i.e., network 1002).

In one exemplary embodiment, the first terminal 12A may generally be associated with a customer/operator computer and the second terminal 12B may generally be associated with a service provider computer or server. One exemplary service provider hosting the second terminal is Patriot Software, LLC of Canton, Ohio. Some exemplary embodiments referred to actions or execution calls entered at an operator/customer's computer (i.e., the first terminal owned by the customer or operator) and concordant responses and functionality of the service provider computer/server (i.e., the second terminal).

The second terminal 12B may be directly or remotely linked with a storage medium configured to store accounting or other business transactions performed by the customer/operator via their first terminal or computer. Stated otherwise, the hard drive 44 may be located within second terminal 12B or the hard drive maybe a remote hard drive located on a cloud-based server 1004 on the network 1002 The second terminal may perform dual ledger entries of the business transactions in response to the customer/operator entering the same via the first terminal. Then, the second terminal enables the first terminal to switch between a cash basis accounting ledger and an accrual basis accounting ledger in response to the operator actuating a switch or toggle at the first terminal.

With continued reference to FIG. 1B, the SaaS system 1000 includes a first terminal 12A in a computing environment 10 associated with a customer, and a second terminal 12B in a computing environment 10 associated with a service provider, wherein the second terminal is internet linked with the first terminal 12A. The system 1000 may further include a cash basis accounting first ledger 1006 hosted by the second terminal 12B that is selectively viewable at the first terminal, generally indicated by dashed line 1006A. An accrual basis accounting second ledger 1008 is hosted by the second terminal 12B and is selectively viewable at the first terminal 12A, generally indicated by dashed line 1008A, wherein view selection of the first ledger and the second ledger is accomplished by a toggle switch at the first terminal. In this exemplary embodiment, the first ledger 1006 and the second ledger 1008 are maintained independently without any modifying entries bridging transactions from first ledger to the second ledger.

System 1000 may provide or include an execution call 1010 generated at the first terminal in response to the customer actuating the toggle switch. The execution call 1010 switches a display in the first terminal 12A either (i) from the first ledger to the second ledger, or (ii) from the second ledger to the first ledger. System 1000 independently maintains the first ledger 1006 and the second ledger 1008 to enable the execution call 1010 to switch between ledger displays without generating modifying entries. System 1000 may further include a transactional or transaction entry entered at the first terminal 12A that is sent across the internet link (i.e., network 1002) to the second terminal 12B. In system 1000, there is accounting data generated at the second terminal 12B corresponding to the transaction entry at the first terminal 12A for independent entry into both the first ledger 1006 and the second ledger 1008. The storage medium stores the accounting data that is populated in the first ledger 1006 and the second ledger 1008. Recall, the storage medium may be the hard drive 44 at the second terminal 12B or it may be at the cloud-based server 1004.

While system 1000 depicts a networked operation between multiple terminals to effectuate the accounting methodologies using dual ledgers without the need for modifying entries, multiple terminals are not required. For example, an exemplary embodiment of the accounting system can run locally on a single computer 12, such as the first terminal 12A. In this embodiment, the system utilizes local processing capabilities at the first terminal 12A to perform the accounting methodologies using dual ledgers without the need for modifying entries. For example, a provider may supply the accounting software to a customer subsequent to a sale of the software. Supplying the accounting software may be accomplished through an internet download or through a physical delivery of a storage medium. Then, the customer would install the software locally onto their computer, such as first terminal 12A. The software would cooperate with the local storage medium directly connected with the first terminal 12A. Then, as the customer inputs accounting transactions into their computer, processing the request and recording to the dual ledgers occurs locally on the same first terminal 12A. Then, when the customer is viewing their accounting data, they may easily toggle between the first ledger and the second ledger entirely locally on the first terminal 12A and without the need for modifying entries.

FIGS. 2-24 depict exemplary screenshots of the accounting software, in accordance with the present disclosure, which performs some of the methods described herein.

Figure 2:
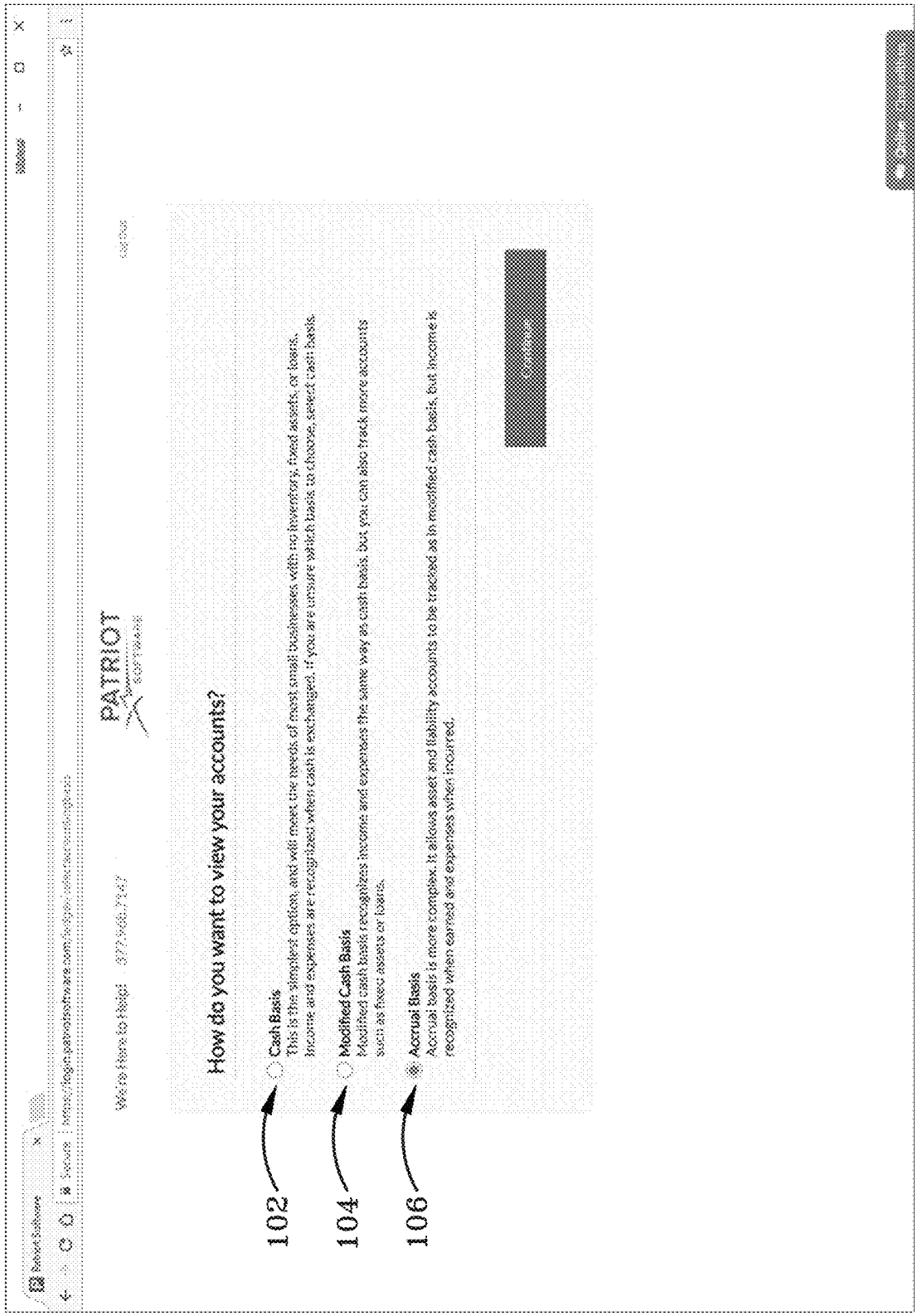
FIG. 2 is a screenshot offering a choice of preference among three accounting basis options.

FIG. 2 depicts an initial setup option as to how the operator desires to view its accounts. In the initial setup, the operator may select cash basis 102, modified cash basis 104, or accrual basis 106. In accordance with one aspect of the present disclosure, the accounting system implemented by the computing environment 10 enables effective switching between the cash basis, the modified cash basis, and the accrual basis options with respect to balance sheets and profit and loss statements and other financial statements. The manner in which the accounting software of the present disclosure accomplishes the switching between the different accounting bases provides improvement in existing computer centric or internet centric technology that, upon information and belief, did not have previous analog versions.

In accordance with one aspect of the present disclosure, the accounting system implemented in the computing environment 10 calculates ledger entries both in a cash basis model and in an accrual basis model, regardless of the initial determination selected by the user at the setup. Stated otherwise, regardless of which accounting basis the operator selects as their preferred accounting basis, the software executed by the computing environment 10 runs reports and ledgers for every entry in the background, even though both ledgers may not be simultaneously displayed to the operator. This effectively enables the present disclosure to continuously have accurate financial statements or ledgers for viewing in either the cash basis manner or the accrual basis manner without the need of creating modifying entries. Stated otherwise, the accounting system of the present disclosure computes and stores two sets of data so as to eliminate the need for modifying entries. As will be described in greater detail below, the operator may toggle or switch between accounting basis methods as desired.

Once an account basis is selected at either 102, 104, or 106, the accounting software prompts a user to create various types of accounts which will be utilized by the accounting software to create invoices, receive payments, pay bills, and create various reports, such as receivable reports, payable reports, and financial reports (account balances, activities by account, profit and loss statements, and balance sheets).

Figure 3A:
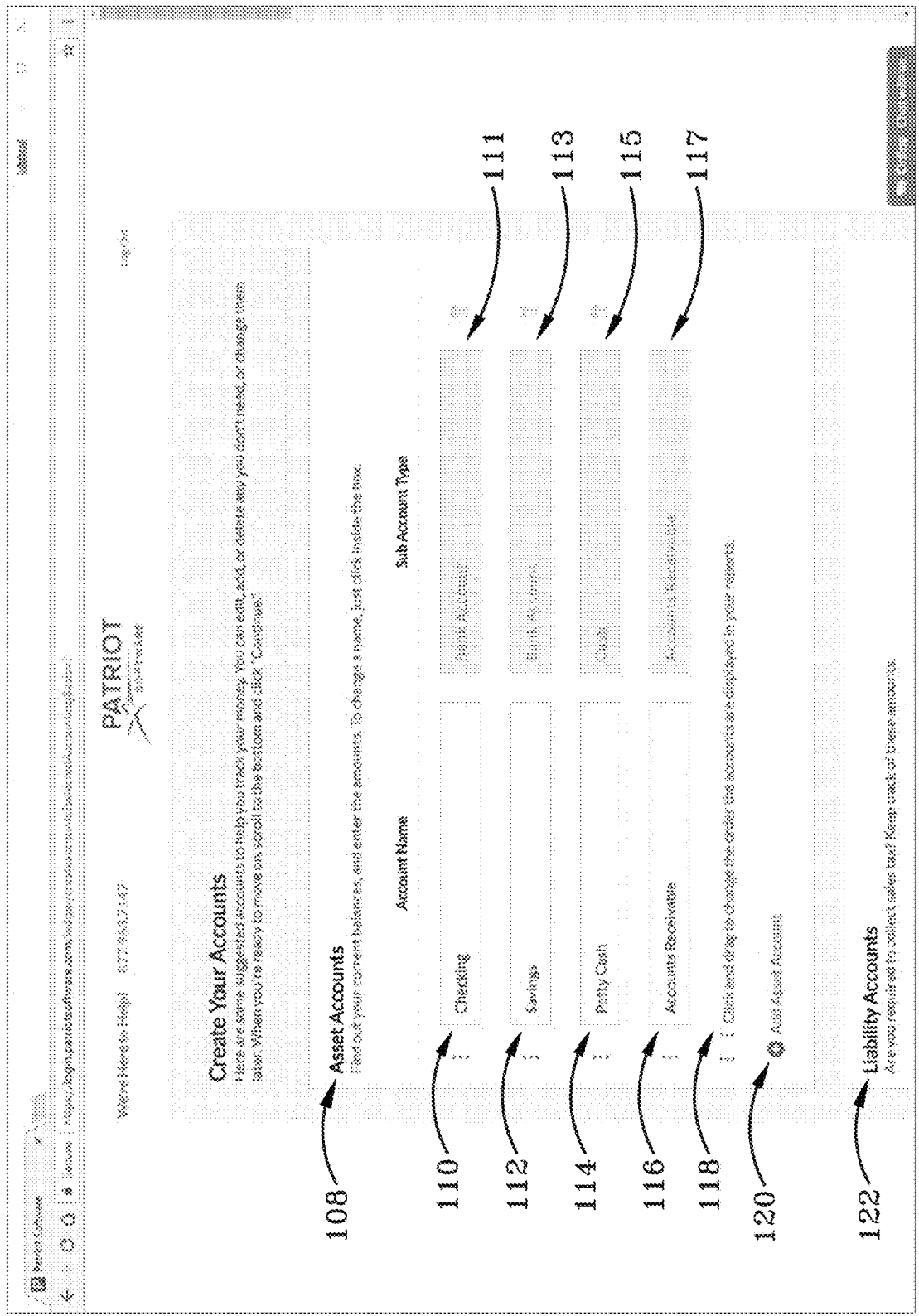
FIG. 3A is a screenshot of asset accounts in the setup module of the accounting software.

FIG. 3A depicts a screenshot of the initial setup in which the operator is prompted to set up various accounts. For convenience, some common accounts are suggested but the operator is enabled to edit names, add more accounts, or delete certain accounts that do not apply. The system may suggest that the user set up common asset accounts 108, such as a checking account 110 with a bank account sub account type 111, a savings account 112 with a bank account sub account type 113, a petty cash account 114 with a cash sub account type 115, and an accounts receivable account 116 with an accounts receivable sub account type 117. Additionally, the software enables the operator to create new asset accounts 120, which will prompt an input box enabling the operator to name the asset account and select a sub account type. Furthermore, the operator may click and drag to change the order of the accounts as they are displayed in the reports, as shown at 118.

Figure 3B:
FIG. 3B is a screenshot of liability accounts and equity accounts in the setup module of the accounting software.

FIG. 3B depicts that the system may additionally suggest common liability accounts 122. For example, liability accounts may be necessary, if the operator is required to collect sales tax, in order to keep track of these amounts. Some exemplary liability accounts include an accounts payable account 124 with an accounts payable sub account type 125, a sales tax collected account 126 with a sales tax payable sub account type 127, and a credit memo liability account 128 with a current liabilities sub account type 129. Additionally, the software enables the operator to create new liability accounts 132 which will prompt an input box enabling the operator to name the liability account and select a sub account type. Furthermore, the operator may click and drag to change the order of the accounts as they are displayed in the reports, as shown at 130.

FIG. 3B also depicts the system suggestions for common equity accounts 134 during initial setup. Equity accounts may include an owner's equity account 136 with an equity sub account type 137. Additionally, the software enables the operator to create new equity accounts 140 which will prompt an input box enabling the operator to name the equity account and select a sub account type. Furthermore, the operator may click and drag to change the order of the accounts as they are displayed in the reports, as shown at 138.

Figure 3C:
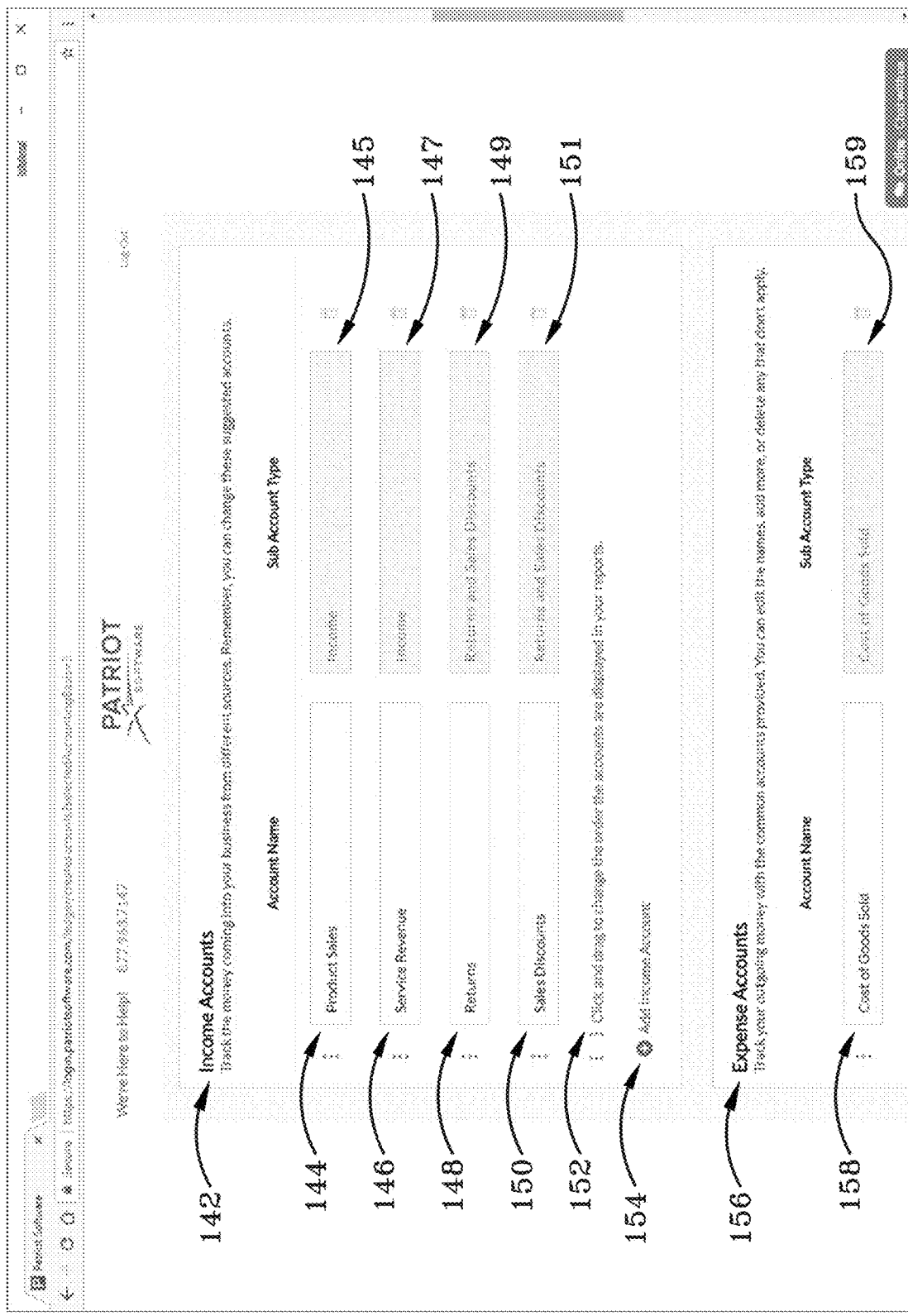
FIG. 3C is a screenshot of income accounts in the setup module of the accounting software.

FIG. 3C depicts income accounts 142 which help track money coming into the business from different sources. Income accounts may include a product sales account 144 with an income sub account type 145, a service revenue account 146 with an income sub account type 147, a returns account 148 with a returns and sales discount sub account type 149, and a sales discounts account 150 with a returns and sales discounts sub account type 151. Additionally, the software enables the operator to create new income accounts 154 which will prompt an input box enabling the operator to name the income account and select a sub account type. Furthermore, the operator may click and drag to change the order of the accounts as they are displayed in the reports, as shown at 152.

Figure 3D:
FIG. 3D is a screenshot of expense accounts in the setup module of the accounting software.
Figure 3E:
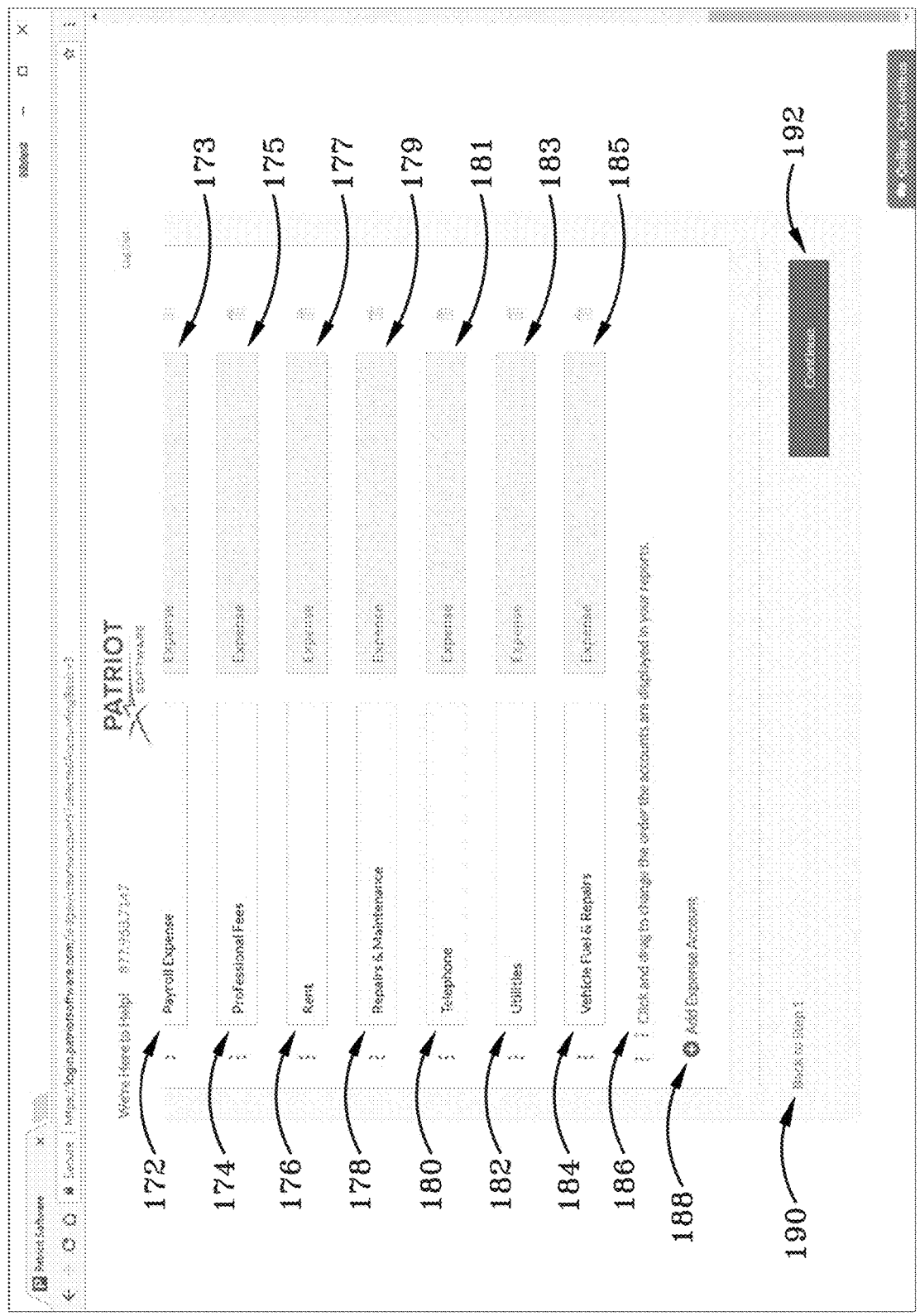
FIG. 3E is a screenshot of additional expense accounts in the setup module of the accounting software.

FIG. 3D and FIG. 3E depicts the initial setup of expense accounts 156 in order to track outgoing money. Some common expense accounts are provided. As with all other types of accounts in the account setup process, the operator is enabled to edit names, add more accounts, or delete certain accounts that do not apply. Some exemplary expense accounts include a cost of goods sold account 158 with a cost of goods sold sub account type 159, and advertising account 160 with an expense sub account type 161, and insurance account 162 with an expense sub account type 163, a job supplies and materials account 164 with an expense sub account type 165, a meals and entertainment account 166 with an expense sub account type 167, a miscellaneous expense account 168 with an expense sub account type 169, an office supplies account 170 with an expense sub account type 171, a payroll expense account 172 with an expense sub account type 173, a professional fees account 174 with an expense sub account type 175, a rent account 176 with an expense sub account type 177 (FIG. 3E), a repairs and maintenance account 178 with an expense sub account type 179, a telephone account 180 with an expense sub account type 181, a utilities account 182 with an expense sub account type 183, and a vehicle fuel and repairs account 184 with an expense sub account type 185. Additionally, the software enables the operator to create new expense accounts 188 which will prompt an input box enabling the operator to name the expense account and select a sub account type. Furthermore, the operator may click and drag to change the order of the accounts as they are displayed in the reports, as shown at 186. The operator is able to go back to change the basis selection (FIG. 2) by clicking a back link 190. After the operator is satisfied with the accounts created, they may continue on to the next setup page by clicking a continue button 192.

With continued reference to FIG. 3A-FIG. 3E, the user or operator may drag and drop accounts that are displayed in a report as shown as 118, 130, 138, 152, and 186. However, the accounting software will not allow an account to be dragged to another section of the chart of accounts. For example, an account receivable, which is an asset account, cannot be dragged and dropped into the liability accounts, the equity accounts, the income accounts, or the expense accounts. Rather, the accounts receivable 116 item can be dragged and dropped via 118 only into other areas of the asset accounts 108.

As indicated in FIG. 3A-FIG. 3E, a delete icon may be located to the right of some of the accounts. However, the delete icon is not present for the accounts receivable account 116, the accounts payable account 124, the sales tax collected account 126, the credit memo liability account 128, and the owner's equity account 136. These accounts are core to operation. They do not have the delete or trash can icon and are not able to be deleted. Any of the remaining accounts not listed above, those with a delete or trash can icon, can be selectively deleted by the operator or user as necessary to edit and amend their specific chart of accounts. After initial setup is complete, as the operator begins to create transactions, the operator will no longer be permitted to delete any account that has been referenced in a transaction. This is done to preserve an audit trail of past transactions. Any account that has been used in a transaction will no longer have the delete or trash can icon and cannot be deleted.

Figure 4:
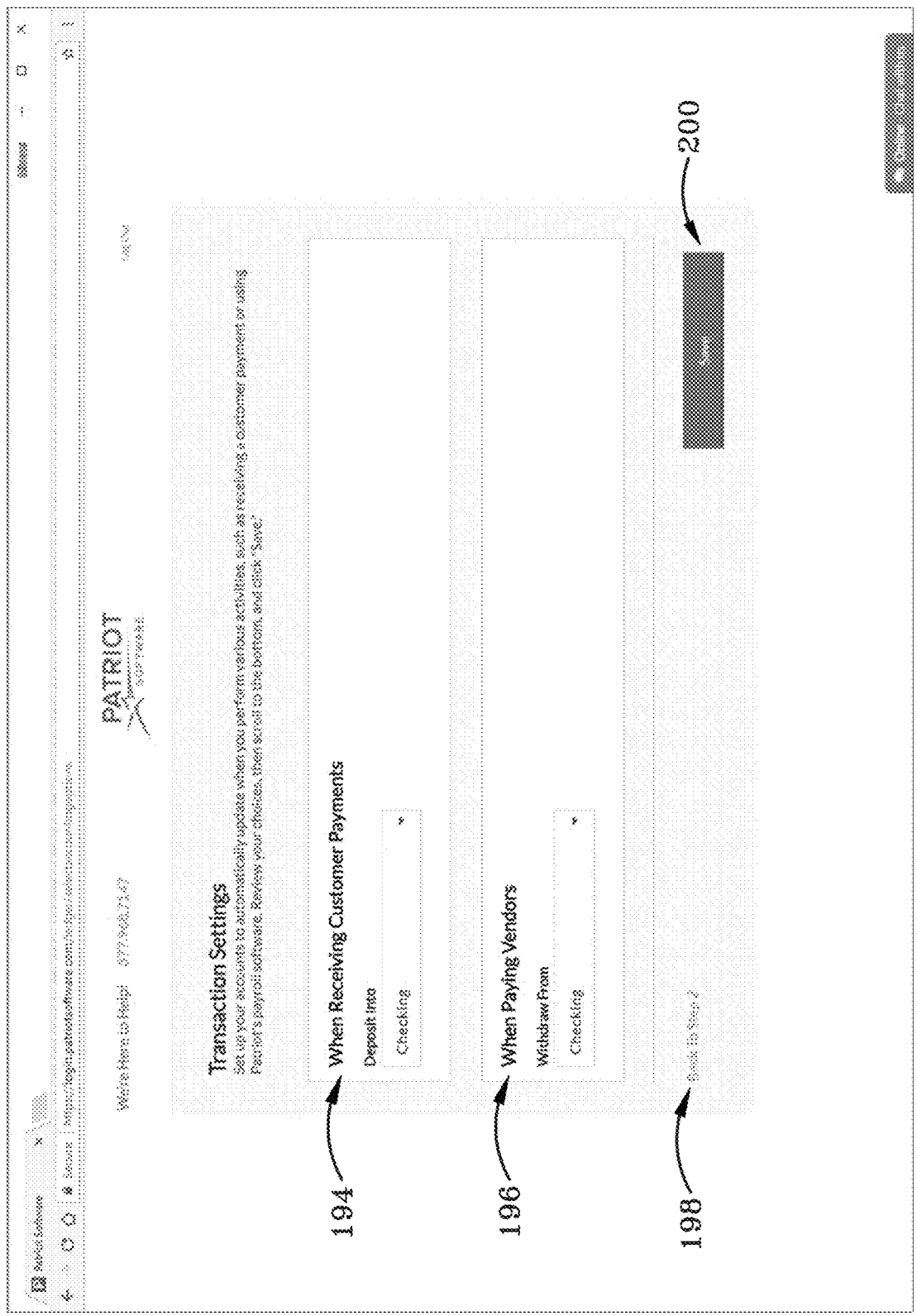
FIG. 4 is a screenshot of transaction settings in the setup module of the accounting software.

FIG. 4 depicts the accounting software setup enabling the operator to select various transaction settings during the setup of an account. The transaction settings enable the user to set up an account to automatically update when the operator performs various activities, such as receiving a customer payment or paying a vendor bill. When receiving customer payments, an option 194 is provided as to where the received customer payments may be deposited, such as into the checking account 110. When paying vendors, an option 196 is provided so as to select where to withdraw the payment, such as from the checking account 110. The operator is able to go back to change accounts created (FIG. 3A-FIG. 3E) by clicking a back link 198. After the operator is satisfied with the transaction settings, they may complete the setup module by clicking a save button 200.

Figure 5:
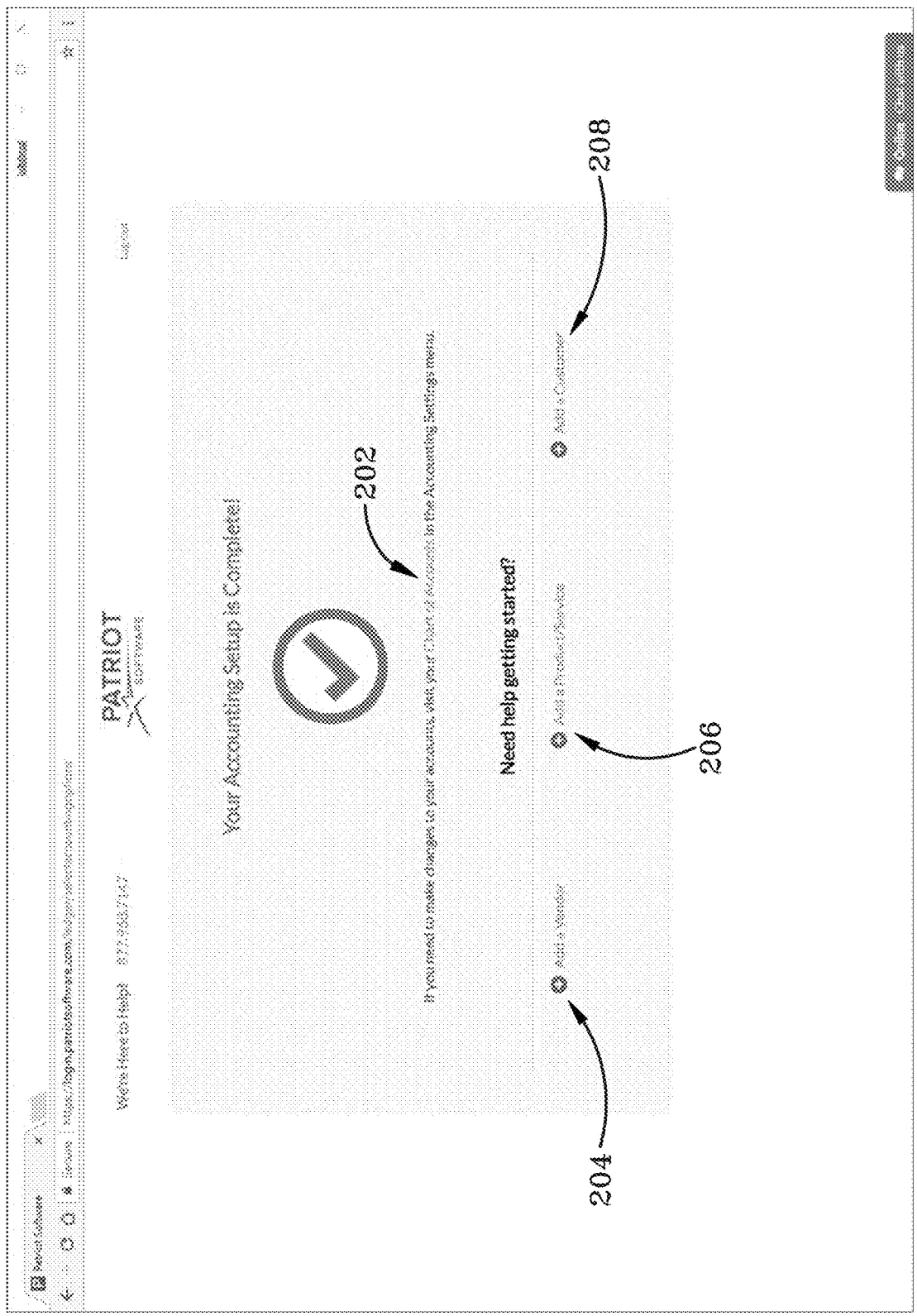
FIG. 5 is a screenshot of a completed setup module of the accounting software.

FIG. 5 depicts that the accounting setup has been completed after the steps identified in FIG. 2-FIG. 4 have been completed by the operator. The accounting software enables the operator to make changes to their accounts by visiting their chart of accounts 202, add a vendor 204, add a product/service 206, or add a customer 208.

Figure 6:
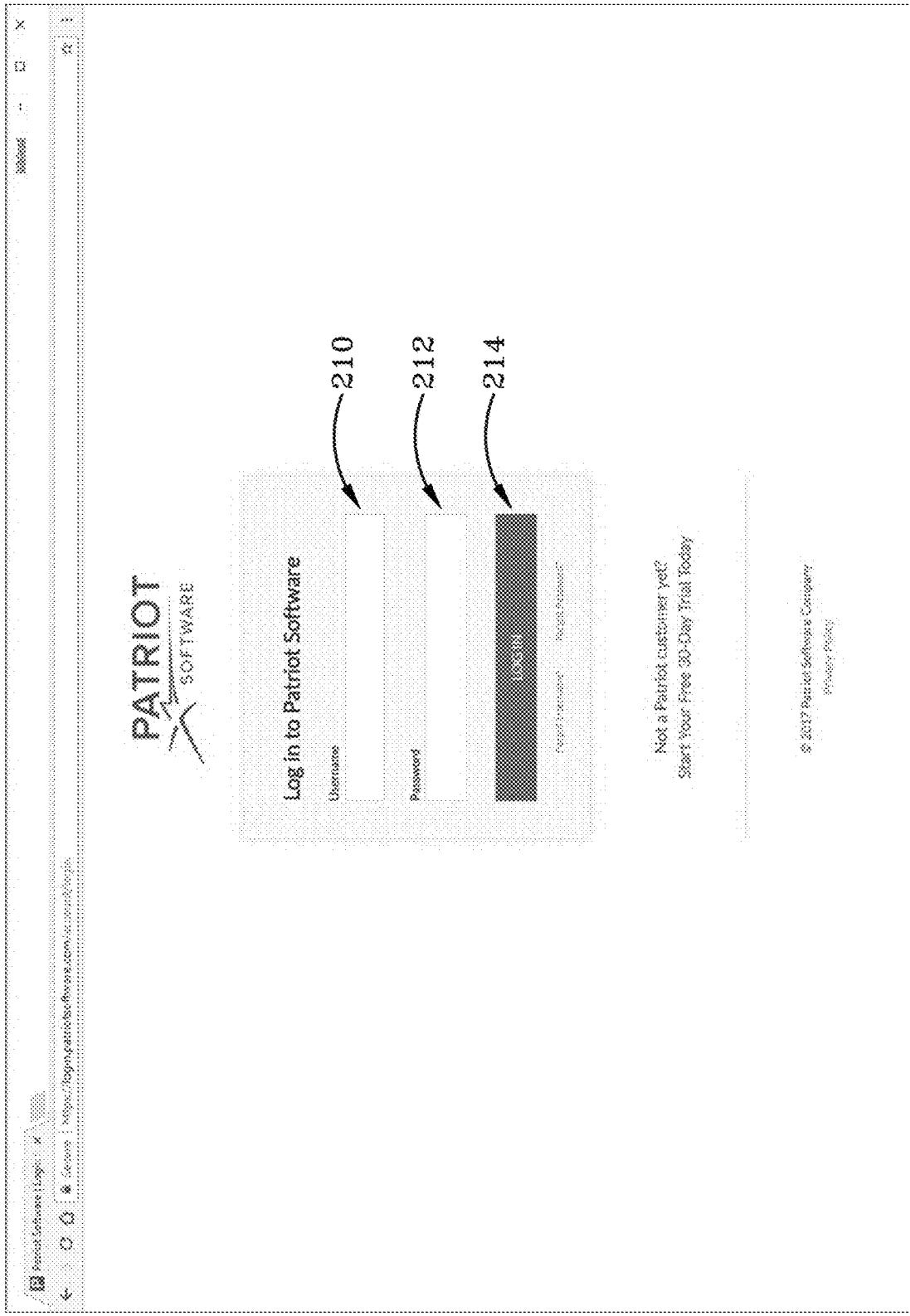
FIG. 6 is a screenshot of a login screen of the accounting software.

FIG. 6 depicts an exemplary login page after the operator has completed the account setup. The login page provides an input area for a username 210, a password 212, and a log in button 214 in order for the customer or operator to access the accounting software described below.

Figure 7:
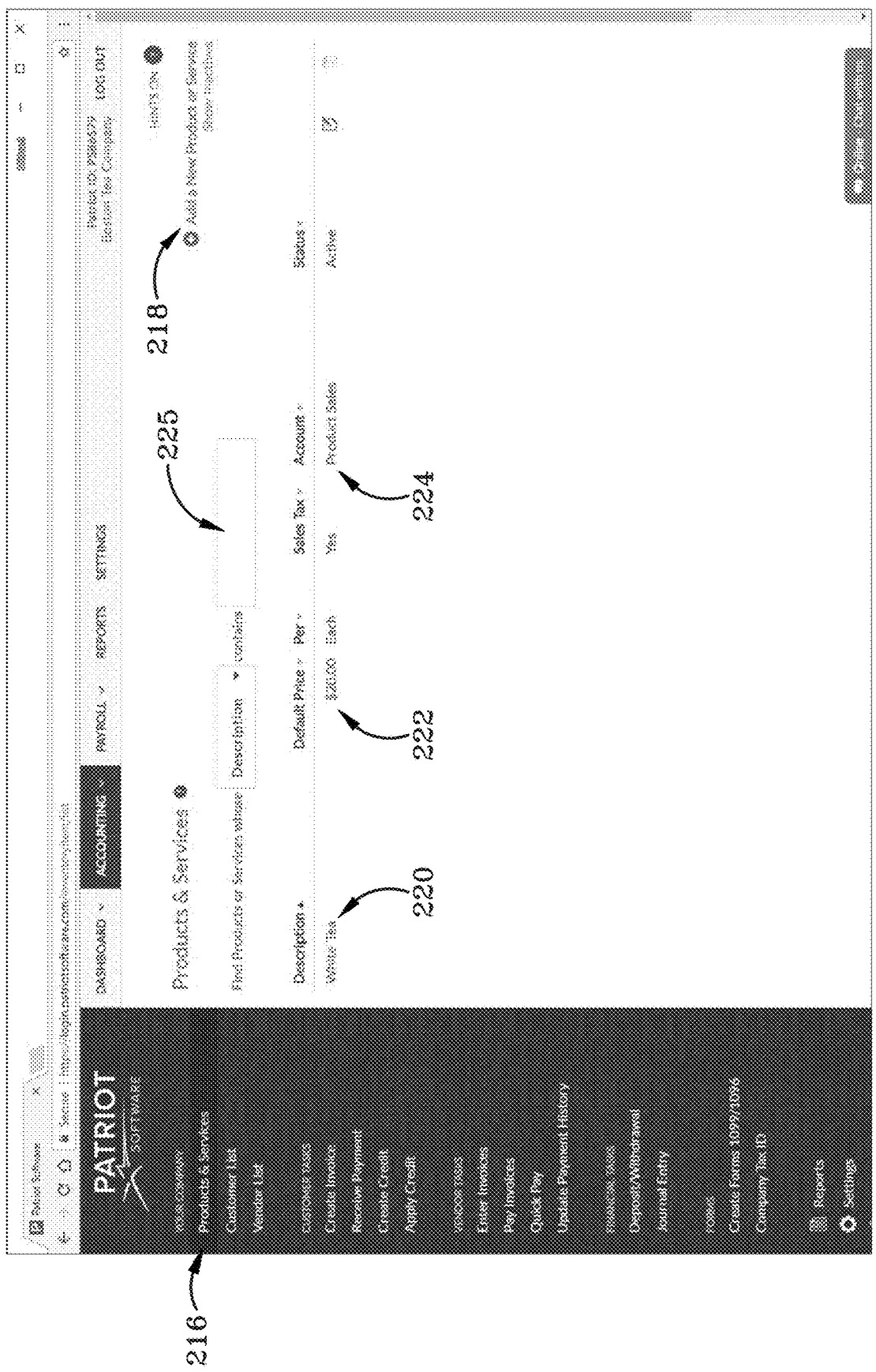
FIG. 7 is a screenshot of products and services in the accounting software.

Once the operator has logged into the software, they may be presented with an interface which provides a number of navigation menus, options, or links as first seen in FIG. 7. These options may be presented at the top of the screen, the left of the screen, or in any other configuration. The user is able to navigate the software in any order they desire. As some of the menus, options, or links do not advance the inventive embodiments of the present disclosure, the figures presented herein depict one exemplary scenario and may not address the menus, options, or links that do not advance the inventive embodiments of the present disclosure.

FIG. 7 depicts the products and services screen 216 which enables an operator to view the various products and services that have been entered into the software. All products and services are listed initially, but the operator may choose to narrow the results shown by searching for a known product or service via query 225. Any products or services meeting the search criteria will appear in the list. For example, the product White Tea at 220 may have a default price of $20.00 each 222 and may be attributed to the Product Sales 224 income account. The operator may add a new product or service at 218 at which time the operator may enter default information about the new product or service.

Figure 8:
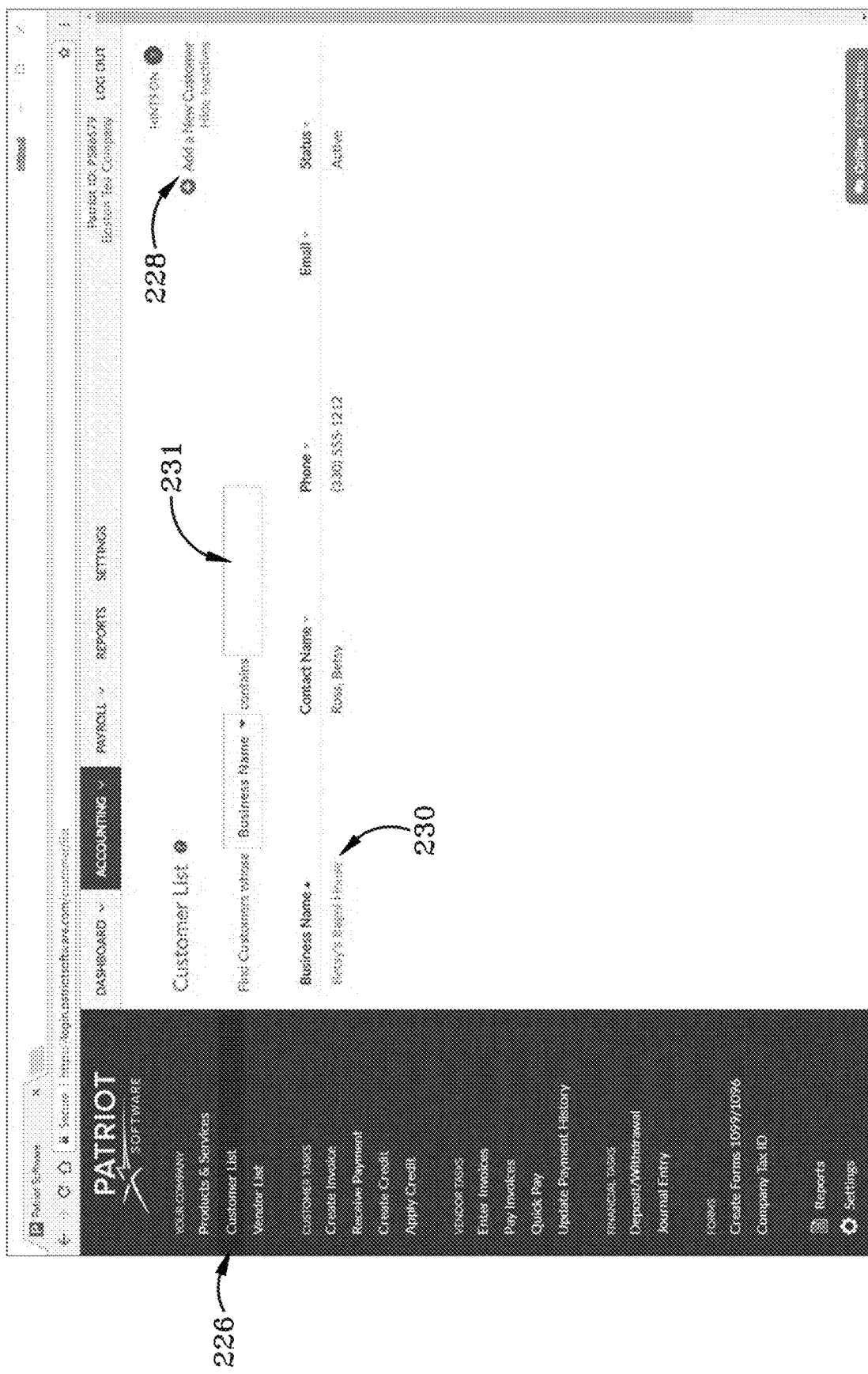
FIG. 8 is a screenshot of customers in the accounting software.

FIG. 8 depicts the customer list 226. Initially all customers are listed, but the operator may choose to narrow the results shown by searching for a known business name via query 231. In addition to the business name, the operator may also search the customer list using known contact information. Any customers meeting the search criteria will appear in the list. For example, Betsy's Bagel House 230 may be one customer in the list. The operator may add new customers at 228 at which time the operator may input a business name, contact information, or other information for the customer being added.

Figure 9:
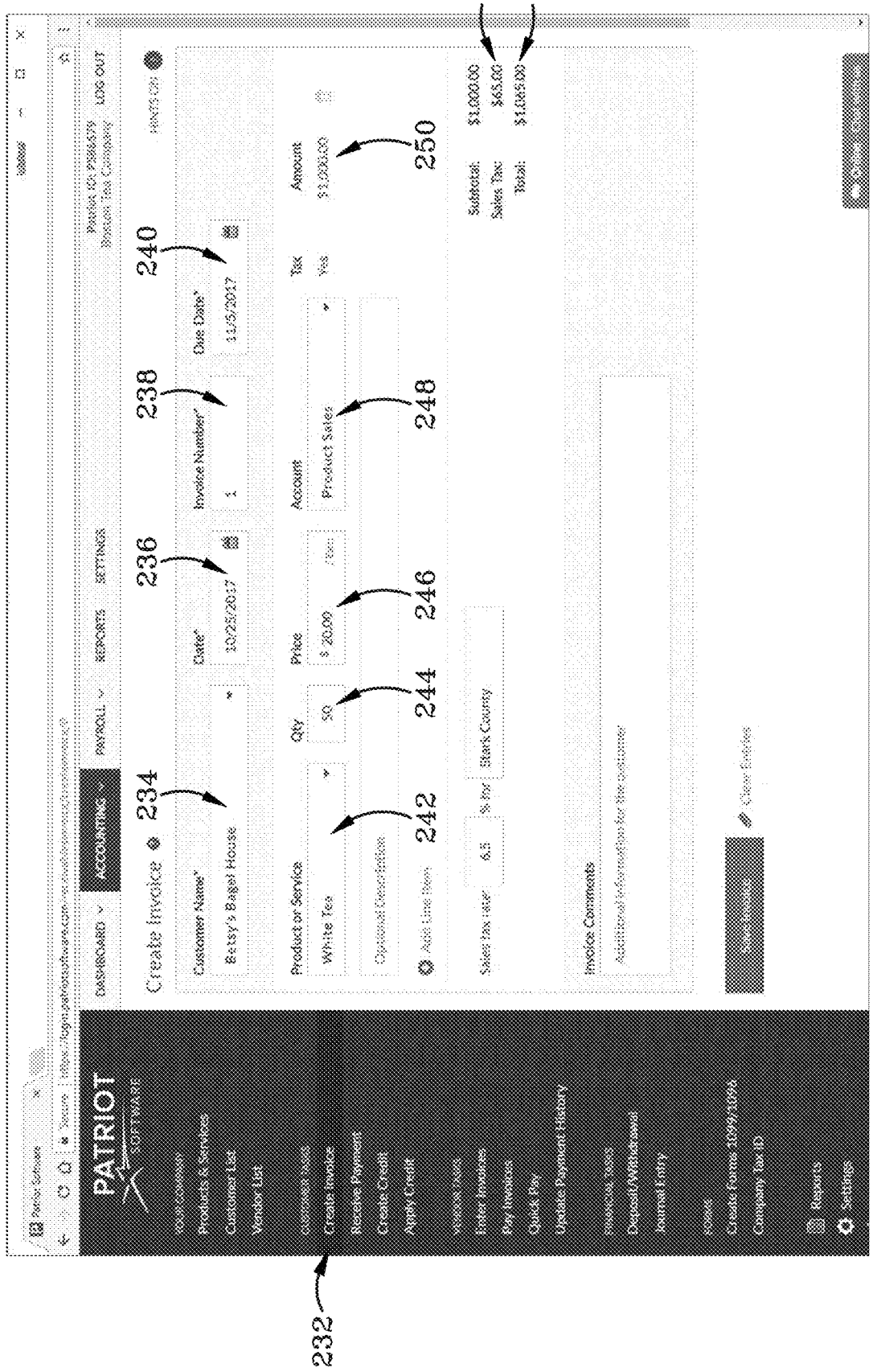
FIG. 9 is a screenshot of customer invoice creation in the accounting software.

FIG. 9 depicts the creation of an invoice that will be sent to a customer to collect for goods or services already delivered 232. The creation of an invoice includes a dropdown menu in which the operator may choose a customer 234 from the customer list 226, such as Betsy's Bagel House. An invoice date may be entered at 236, an invoice number may be entered at 238, and a due date at 240. A dropdown menu in which the operator may choose a product or service 242 from the products and services at 216. For example, FIG. 9 depicts invoice number 1 to Betsy's Bagel House at 230 for 50 units at 244 of White Tea at 242 at $20.00 each 246 attributable to the product sales income account 248 for a total of $1,000.00 at 250. Sales tax amounts to $65.00 at 252 for an invoice total of $1,065.00 at 254. As one having ordinary skill in the art understands, how the entries, resulting from the creation of this customer invoice, appear in reports will depend on which ledger the user has chosen to view. In a cash basis model, the invoice entries will not appear in the ledger because the payment has not yet been received. In an accrual basis model, the income has already been earned; therefore, the invoice entries will appear in the ledger. The entries that are created in the accrual ledger will use the income account selected at 248 and the accounts receivable account 116. These different views of the same event, the creation of a customer invoice, will be seen more clearly in the figures depicting financial reports below.

During invoice creation, the system performs calculations to account for this invoice in both an accrual basis model and a cash basis model and maintains separate ledgers for each, regardless of the accounting basis selected by the operator during initial setup FIG. 2. The system's ability to run an accrual basis ledger and a cash basis ledger while only displaying one version at a time to the user enables the system to effectively switch between the two ledgers without the need for modifying entries into one of the ledgers. In this model, the accounting basis selection is simply a preference. Switching that preference has no effect on the underlying ledgers, it simply changes which ledger is displayed to the operator. This helps solve a computer centric or internet centric problem typically seen with modifying entries related to miscalculations either related to user entry or improper computer calculations. In each instance, the accounting software provides the dual ledger calculations required to solve the computer centric problems related to, but not limited to, the structure of computer environment 10 that addresses and resolves the problems identified herein. The accounting software implementing this dual ledger system provides significantly more advantages to solve these computer centric problems related to modifying entries by providing an exemplary inventive concept as specific logic structure and concordant functionality of the method and system so as to extend beyond merely gathering data, analyzing the information, and displaying the results.

Figure 10:
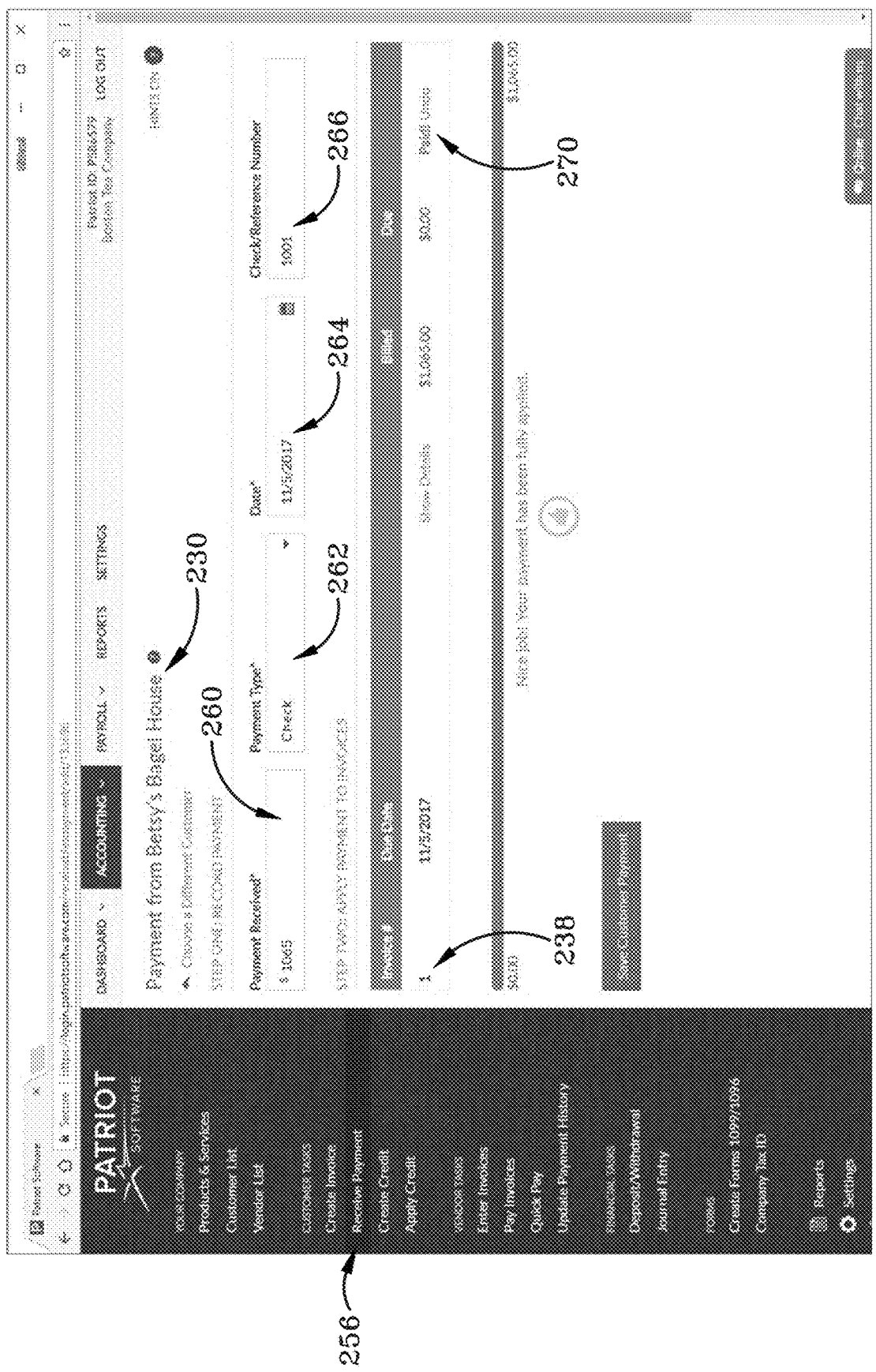
FIG. 10 is a screenshot of customer payment receipt in the accounting software.

FIG. 10 depicts the receipt of a customer payment 256. The operator may enter the amount received 260, payment type 262, payment receipt date 264, and a check or reference number 266 associated with the payment. In this example, the operator received check number 1001 at 266 for $1,065.00 at 260 from their customer Betsy's Bagel House at 230 to be applied to outstanding invoice 1 at 238, which was created in FIG. 9. Additionally, the operator allocated the amount received to pay invoice 1 at 238 in full 270. How the resulting entries appear in reports will depend on which ledger the user has chosen to view. If the user has chosen to view the cash basis ledger, the result will be an increase in the account chosen upon invoice creation at 248. If the user has chosen to view the accrual ledger, the result will be a reduction in accounts receivable 116. Both methods will result in an increase to the account chosen in FIG. 4 Transaction Settings at 194. These different views of the same event, the payment of a customer invoice, will be seen more clearly in the figures depicting financial reports below.

Figure 11:
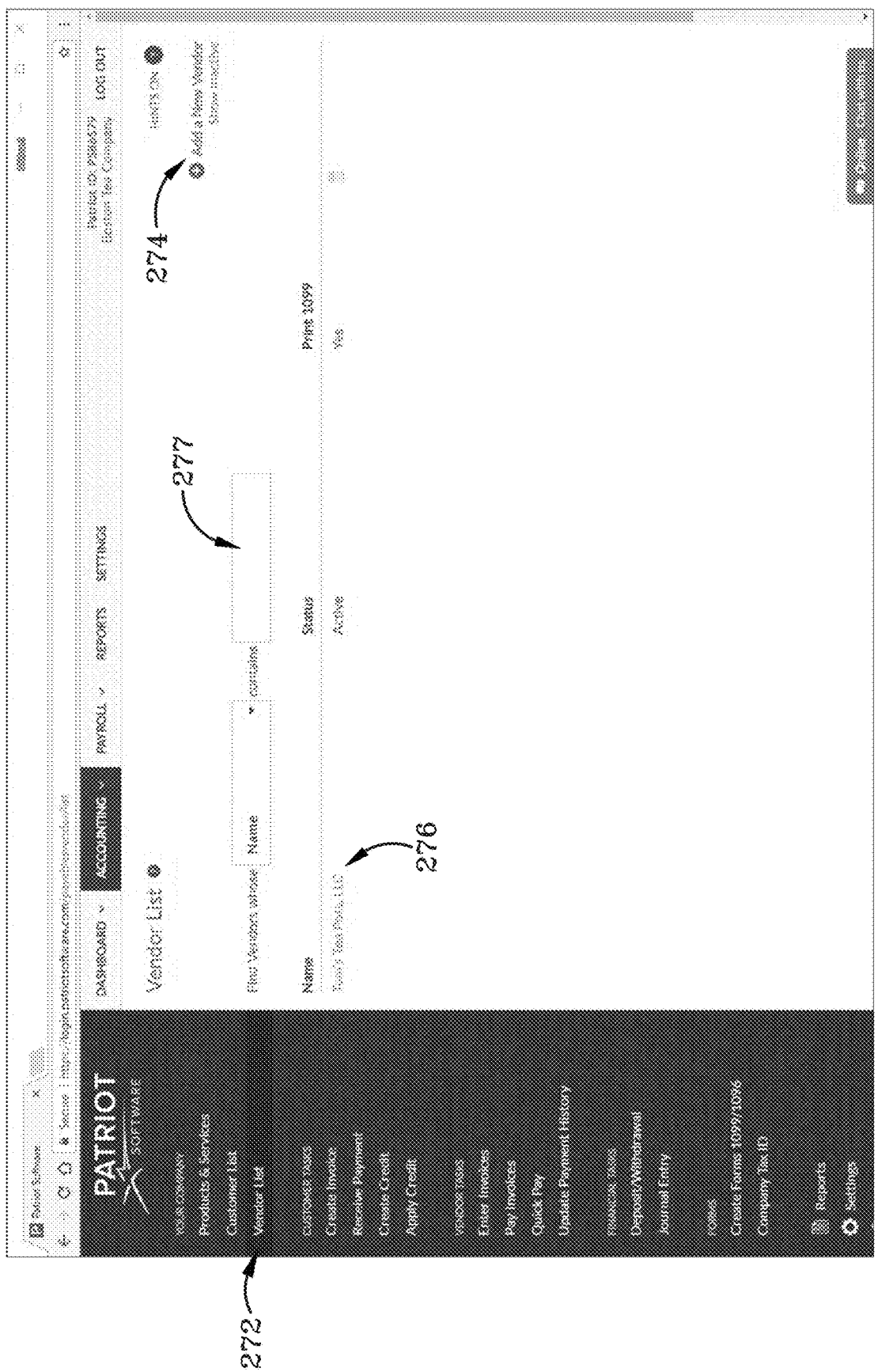
FIG. 11 is a screenshot of vendors in the accounting software.

FIG. 11 depicts the vendor list 272. All vendors are listed initially, but the operator may choose to narrow the results shown by searching for a known business name via query search 277. For example, Tom's Tea Pots, LLC 276 may be one vendor in the list. A new vendor may be added at 274 at which time the operator may input a name and other pertinent information for the vendor being added.

Figure 12:
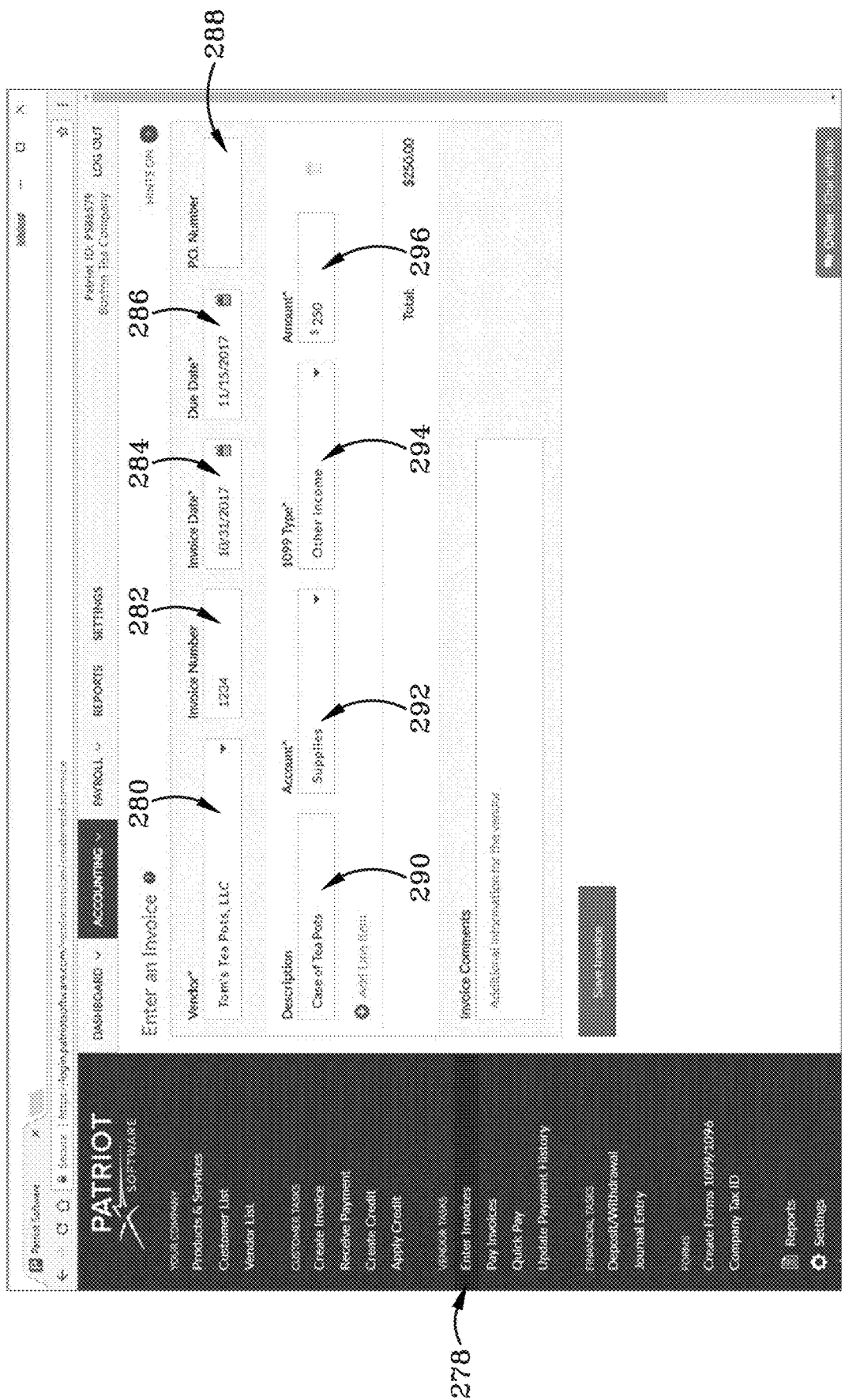
FIG. 12 is a screenshot of entering a vendor invoice in the accounting software.

FIG. 12 depicts the entry of an invoice received from a vendor 278. The entry of a vendor invoice includes a dropdown menu in which the operator may choose a vendor 280 from the vendor list 272 such as Tom's Tea Pots, LLC. An invoice number 282 may be entered, an invoice date 284 is provided, due date 286 is provided, a P.O. number 288 may be provided, and a description 290 of the transaction may be provided. Further, a dropdown menu in which the operator may choose an account 292 to charge the invoice is provided. The operator may also select a 1099 type from the dropdown menu 294 and enter the amount 296. For example, FIG. 12 depicts invoice number 1234 at 282 from Tom's Tea Pots, LLC 276 dated Oct. 31, 2017 at 284 and due Nov. 15, 2017 at 286 for a case of tea pots 290 charged to the supplies account 292 with a 1099 type of other income 294 in the amount of $250.00 at 296. How the entries, resulting from the creation of this vendor invoice, appear in reports will depend on which ledger the user has chosen to view. In a cash basis model, the invoice entries will not appear in the ledger because the invoice has not yet been paid. In an accrual basis model, the expense has already been incurred; therefore, the invoice entries will appear in the ledger. The entries that are created in the accrual ledger will use the expense account selected at 292 and the accounts payable account 124. These different views of the same event, the creation of a vendor invoice, will be seen more clearly in the figures depicting financial reports below.

Figure 13:
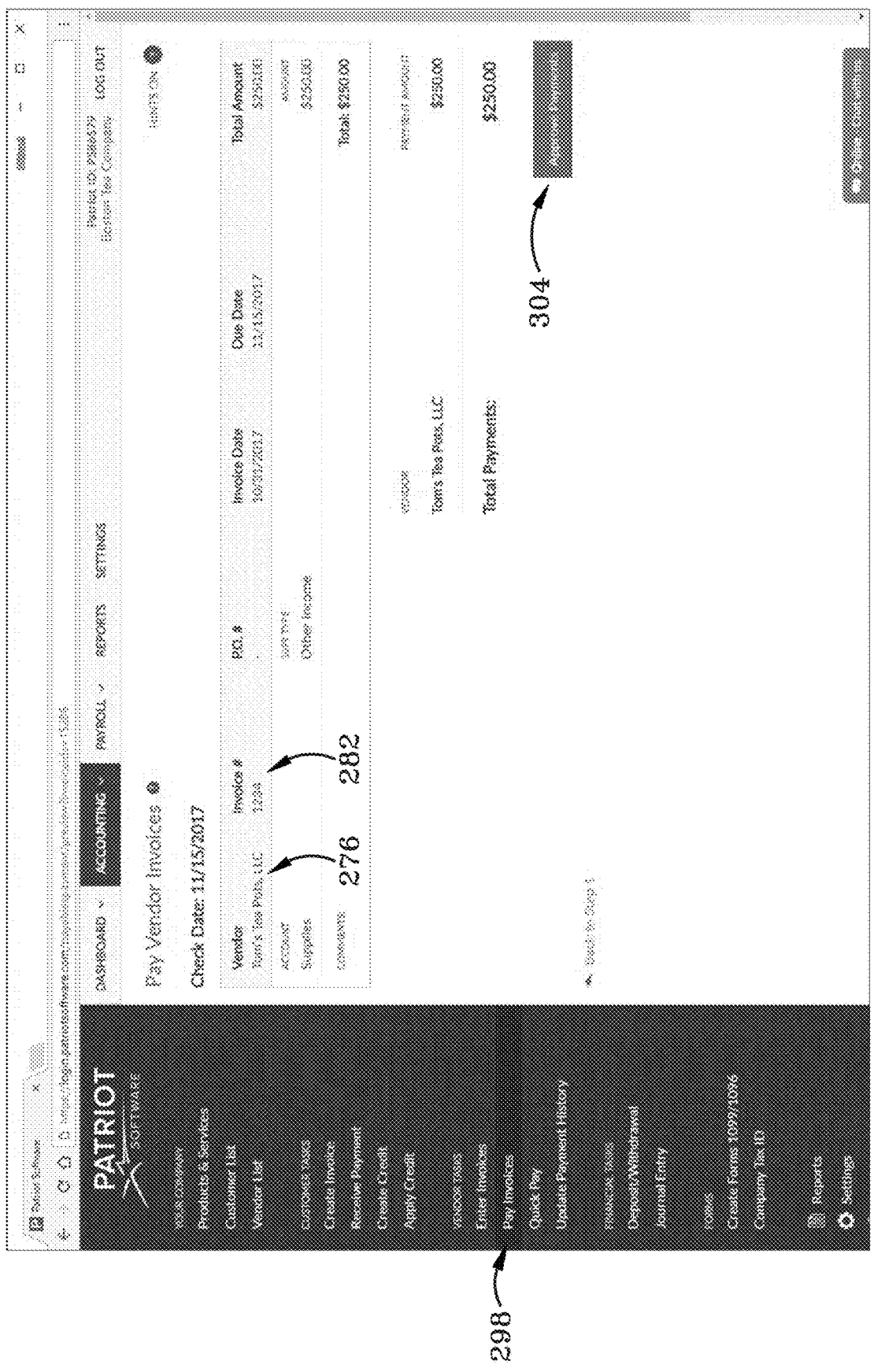
FIG. 13 is a screenshot of paying a vendor invoice in the accounting software.

FIG. 13 depicts the payment of the vendor invoice 298 previously entered in FIG. 12. In this example, the operator has selected invoice 1234 at 282 from vendor Tom's Tea Pots, LLC 276 for payment that may be approved at 304. How the resulting entries appear in reports will depend on which ledger the user has chosen to view. If the user has chosen to view the cash basis ledger, the result will be an increase in the account chosen upon invoice creation at 292. If the user has chosen to view the accrual ledger, the result will be a reduction in accounts payable 124. Both methods will result in a reduction to the account chosen in FIG. 4 Transaction Settings at 196. These different views of the same event, the payment of a vendor invoice, will be seen more clearly in the figures depicting financial reports below.

The manner in which the accounting software of the present disclosure enables the toggling between the cash basis financial reports and the accrual basis financial reports occurs differently than conventional known manners. The accounting software of the present disclosure uses logic that implements a dual ledger system. The dual ledger system of the present disclosure captures every entry and records it in both an accrual basis method/ledger and a cash basis method/ledger. Thus, two complete records or ledgers are being maintained, although only one is displayed to the user, as determined by the default accounting basis selected in FIG. 2 or by the selective toggle switch in each report as will be demonstrated in FIG. 14 through FIG. 23B. As used herein, reference is made to the dual ledgers, namely, the cash basis ledger and the accrual basis ledger, which are distinct and different from the common or generally accepted accounting principles of double entry accounting. Double entry accounting, as one having ordinary skill in the art understands, provides that every entry into the accounting system requires two entries in different accounts that offset each other, thereby keeping the books in balance. Thus, as used herein, the dual ledgers is not to be confused with double entry accounting methods or methodologies.

While all accounts may be included in entries made to the accrual ledger, there are a number of accounts that should never be used to make entries into the cash ledger. Some examples of these accounts are the accounts receivable 116 asset account and the accounts payable 124 liability account. Additionally, current asset accounts, fixed asset accounts, accumulated depreciation accounts, or certain other accounts that are necessary for accrual basis accounting, should never be used in cash ledger entries. Because these accounts would only serve to clutter the interface and possibly confuse users who have selected cash basis, these accounts are hidden from view when cash basis is selected. With continued reference to FIG. 3A-FIG. 3E, the accounting basis selected in FIG. 2, such as cash basis 102 or accrual basis 106, may determine which accounts are visible to the operator, but that selection does not change which accounts are created. Accounts necessary for maintaining the accrual ledger are created and may be hidden from view in cash basis. Accounts that are hidden in cash basis will not appear in dropdown lists, settings, or reports when cash basis is selected. The existence of these hidden accounts allows the system to create a dual ledger system so as to run background calculations for accrual basis even though the user has selected cash basis. The maintenance of dual ledgers for both the cash and accrual ledgers effectuates the easy transition or toggling from cash basis to accrual basis, as determined by the default accounting basis selected in FIG. 2 or by the selective toggle switch in each report as will be demonstrated in FIG. 14 through FIG. 23B.

One fundamental difference between cash basis and accrual basis accounting has to do with when revenue is recognized and recorded. Using the cash basis method of accounting, revenue is recognized and recorded when the funds are actually received and expenses are recognized and recorded when payments are actually made. Using the accrual basis method, revenues are recognized once an item or service is delivered, creating a receivable that will be received in the future, and expenses are recognized when they are incurred, creating a payable that will be paid at a point in the future. The accounting system of the present disclosure considers products and services to be delivered when the invoice is created and expenses to be incurred when the vendor bill is created. Because the rules for revenue recognition in cash basis are different from those in accrual basis, the creation of an invoice or vendor bill has different implications for the cash ledger and the accrual ledger. In a cash basis model, the invoice that is generated makes no entries in the cash ledger because no entry is needed until the money is received. However, in the accrual basis model, an entry is made to indicate that the revenue has been earned but not yet collected. Additionally, the implications for the cash ledger and the accrual ledger are different when a payment is received and applied to pay off an invoice. When a payment is received, an entry must be made to the cash ledger since the receipt of payment is the moment when revenue is recognized in cash basis. An entry must also be made to account for the payment in the accrual ledger, but not the same entry that was made in the cash ledger. The accrual entry must reflect the fact that an amount that was earned and has been owed has now been received. These models of revenue recognition hold equally for customer invoices and vendor invoices. The accounting software of the present disclosure takes all of this into consideration and makes the necessary entries in both the cash ledger and the accrual ledger.

A second fundamental difference between cash basis and accrual basis accounting is known as "the matching principle" and has to do with the matching of transactions to the time periods, typically months, to which they apply. The accounting software of the present disclosure does not currently make any time matching entries on behalf of the user; however, it does provide accrual accounts that allow the user to make these matching entries for themselves when appropriate. Where accrual accounts are made available and when they may be used will be outlined in more detail below.

Figure 14:
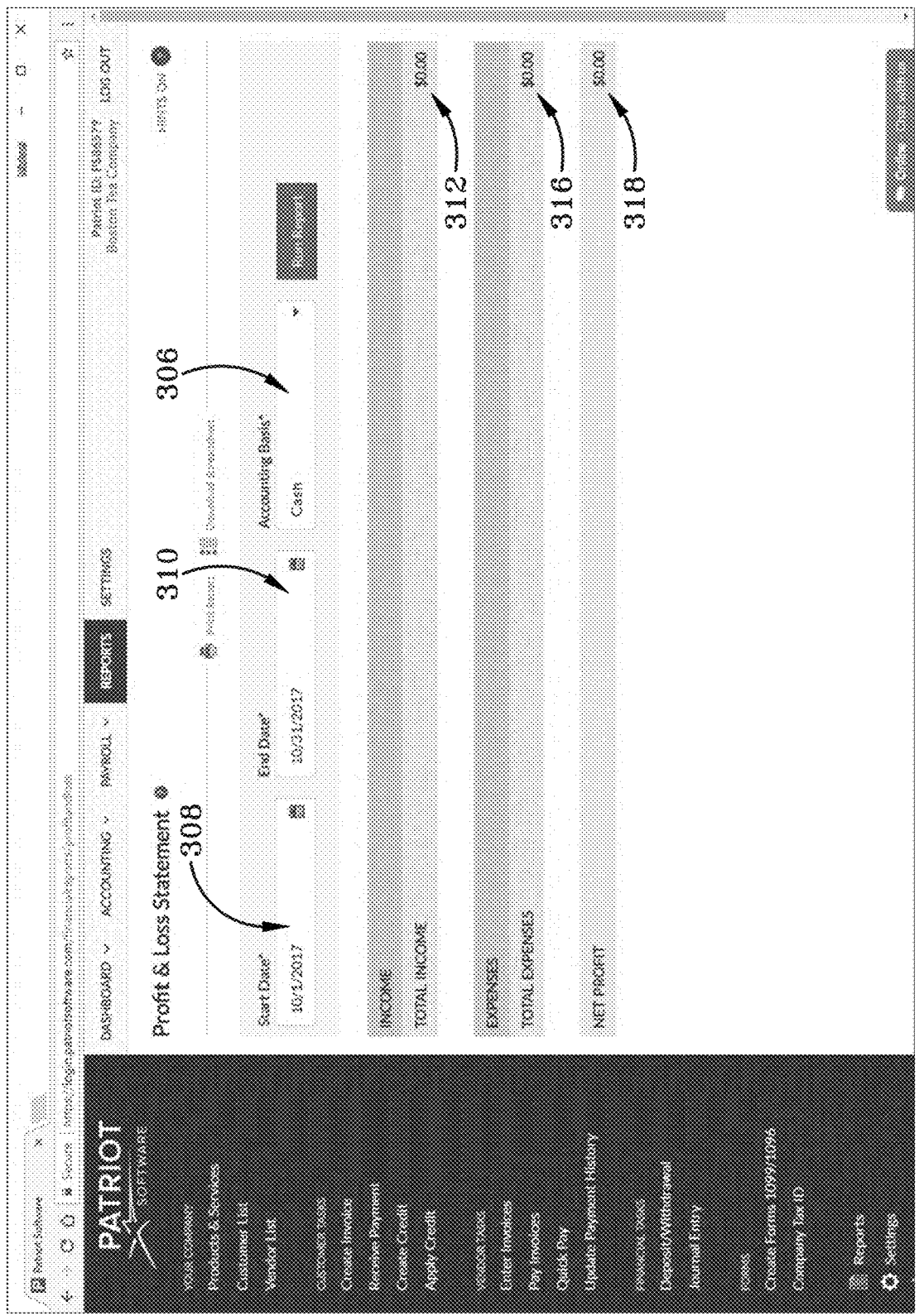
FIG. 14 is a screenshot of the profit and loss statement in cash basis view for the period Oct. 1, 2017 through Oct. 31, 2017 in the accounting software.

FIG. 14 depicts a cash basis 306 profit and loss statement for the period beginning Oct. 1, 2017 at 308 and ending Oct. 31, 2017 at 310. Total income for the period is $0.00 at 312 and total expenses are $0.00 at 316, resulting in a $0.00 net profit 318.

Figure 15:
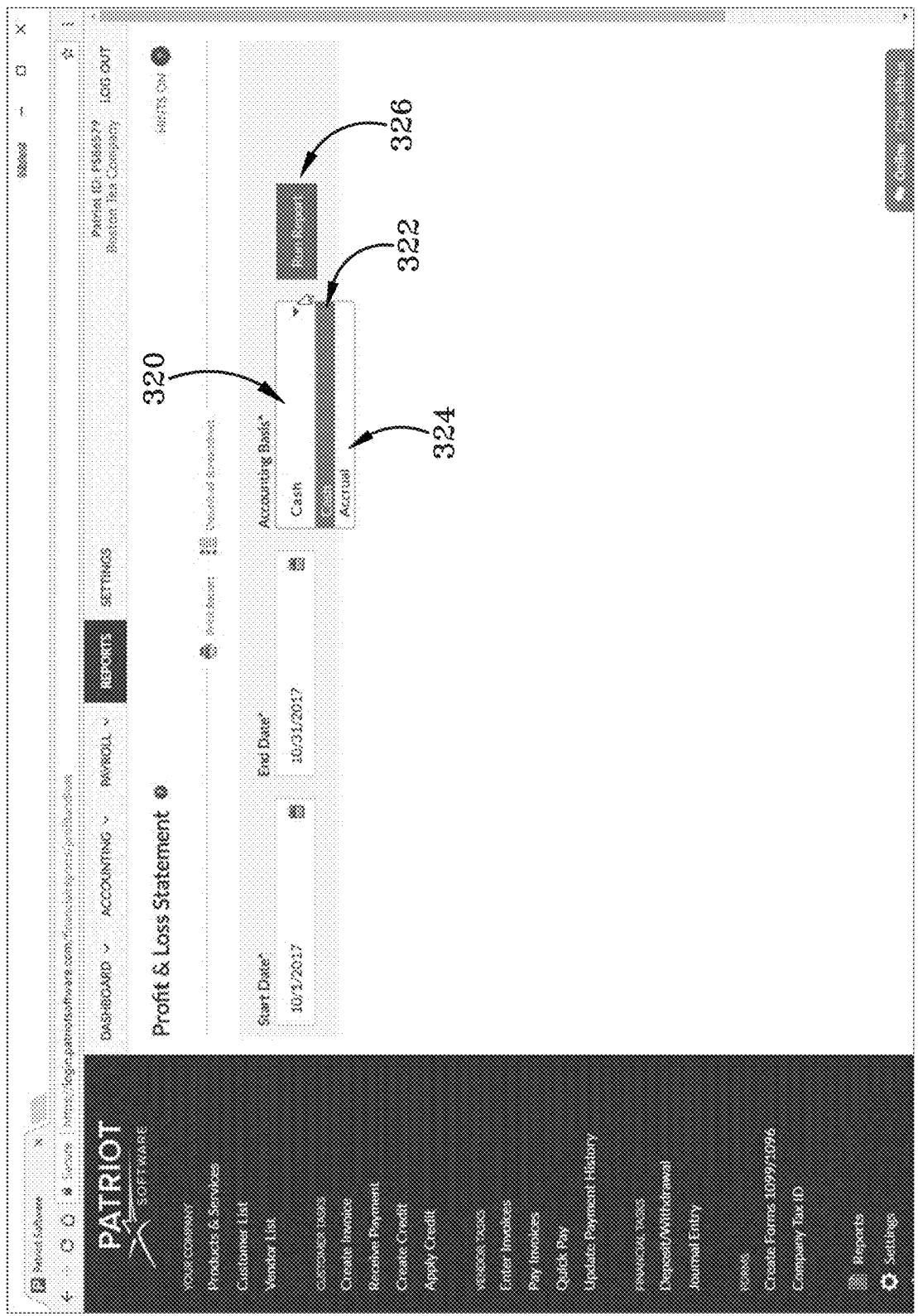
FIG. 15 is a screenshot showing the switching or toggling between the cash basis view and the accrual basis view of the profit and loss statement in the accounting software.

FIG. 15 depicts that the balance sheet can be toggled via box 320 between the cash basis view 322 and the accrual basis view 324. In order to view the balance sheet in an accrual basis, the dropdown menu 320 must be selected to accrual basis 324 and then a report run via activation button 326.

Figure 16:
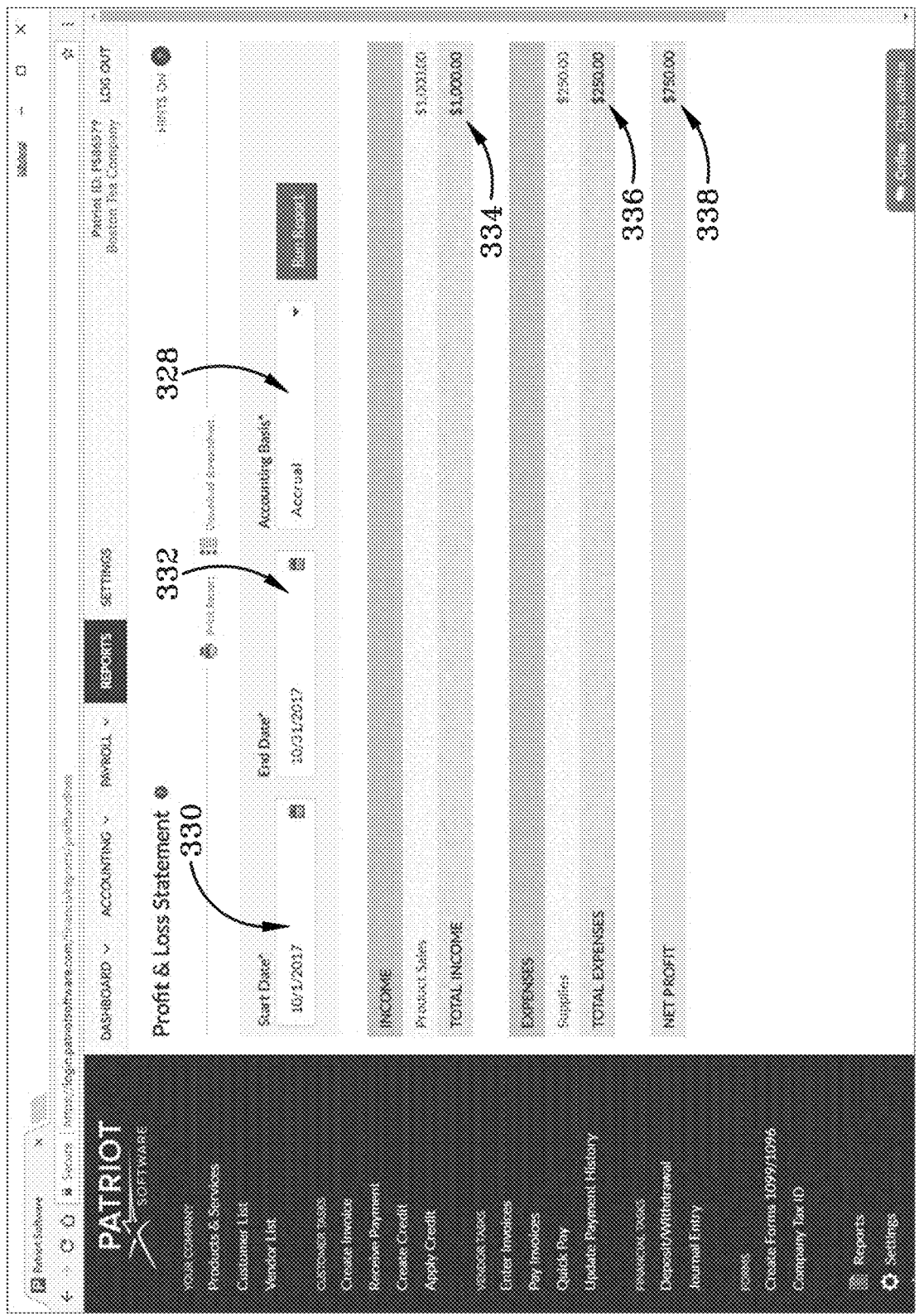
FIG. 16 is a screenshot of the profit and loss statement in accrual basis view for the period Oct. 1, 2017 through Oct. 31, 2017 in the accounting software.

FIG. 16 depicts an accrual basis 328 profit and loss statement for the period beginning Oct. 1, 2017 at 330 and ending Oct. 31, 2017 at 332. Total income is $1,000.00 at 334 and total expenses are $250.00 at 336, resulting in a net profit of $750.00 at 338. This deviates from the cash basis results in FIG. 19 because, in accrual accounting, the sale to Betsy's Bagel House in the amount of $1,000.00 in FIG. 9 is recorded as of the invoice date of Oct. 25, 2017, although the funds have not yet been received from the customer. Similarly, the $250.00 vendor invoice in FIG. 12 is also recorded as of the invoice date of Oct. 31, 2017, although the payment has not yet been remitted to the vendor.

Figure 17:
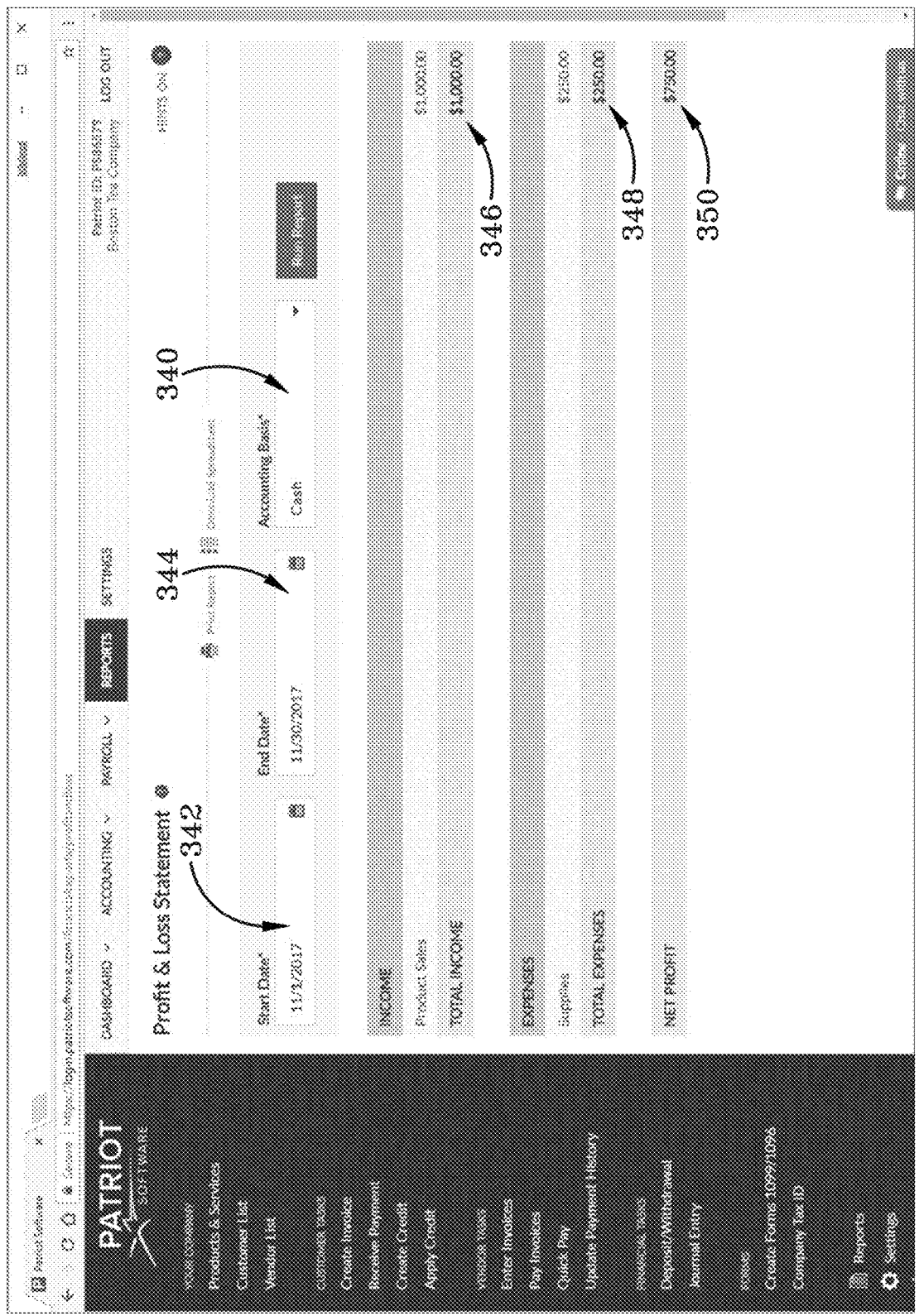
FIG. 17 is a screenshot of the profit and loss statement in cash basis view for the period Nov. 1, 2017 through Nov. 30, 2017 in the accounting software.

FIG. 17 depicts a cash basis 340 profit and loss statement for the period beginning Nov. 1, 2017 at 342, and ending Nov. 30, 2017 at 344, one month after the profit and loss statement shown in FIG. 14. Total income is $1,000.00 at 346, and total expenses are $250.00 at 348, resulting in a net profit of $750.00 at 350.

Figure 18:
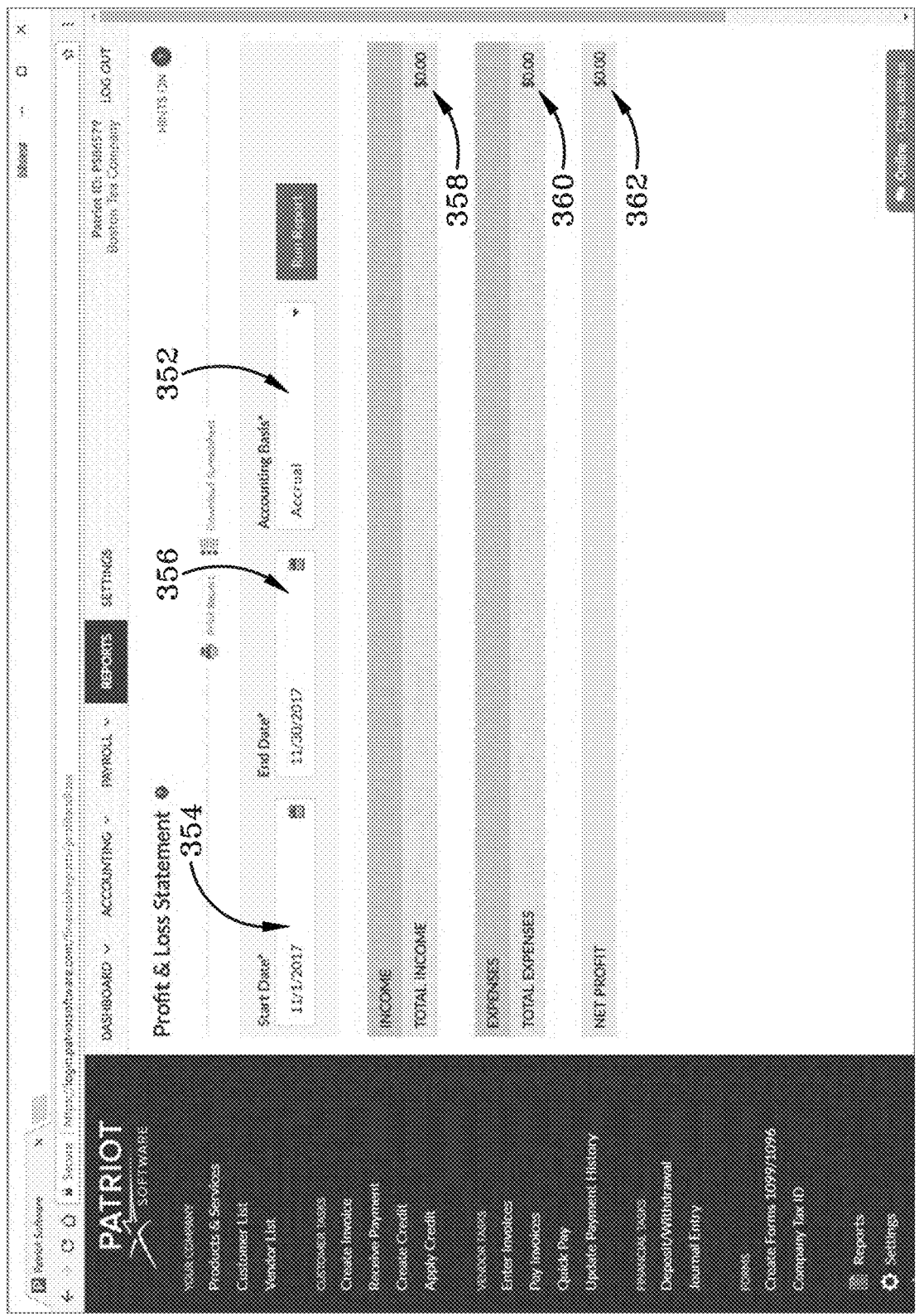
FIG. 18 is a screenshot of the profit and loss statement in accrual basis view for the period Nov. 1, 2017 through Nov. 30, 2017 in the accounting software.

FIG. 18 depicts an accrual basis 352 profit and loss statement for the period beginning Nov. 1, 2017 at 354 and ending Nov. 30, 2017 at 356, one month after the profit and loss statement shown in FIG. 16. Total income is $0.00 at 358 and total expenses are $0.00 at 360, resulting in a $0.00 net profit at 362. This deviates from the cash basis results in FIG. 17 because, in accrual accounting, the sales to Betsy's Bagel House in the amount of $1,000.00 in FIG. 9 was previously recognized on the invoice date of Oct. 25, 2017. Similarly, the $250.00 vendor invoice in FIG. 12 was previously recorded as of the invoice date of Oct. 31, 2017.

Figure 19A:
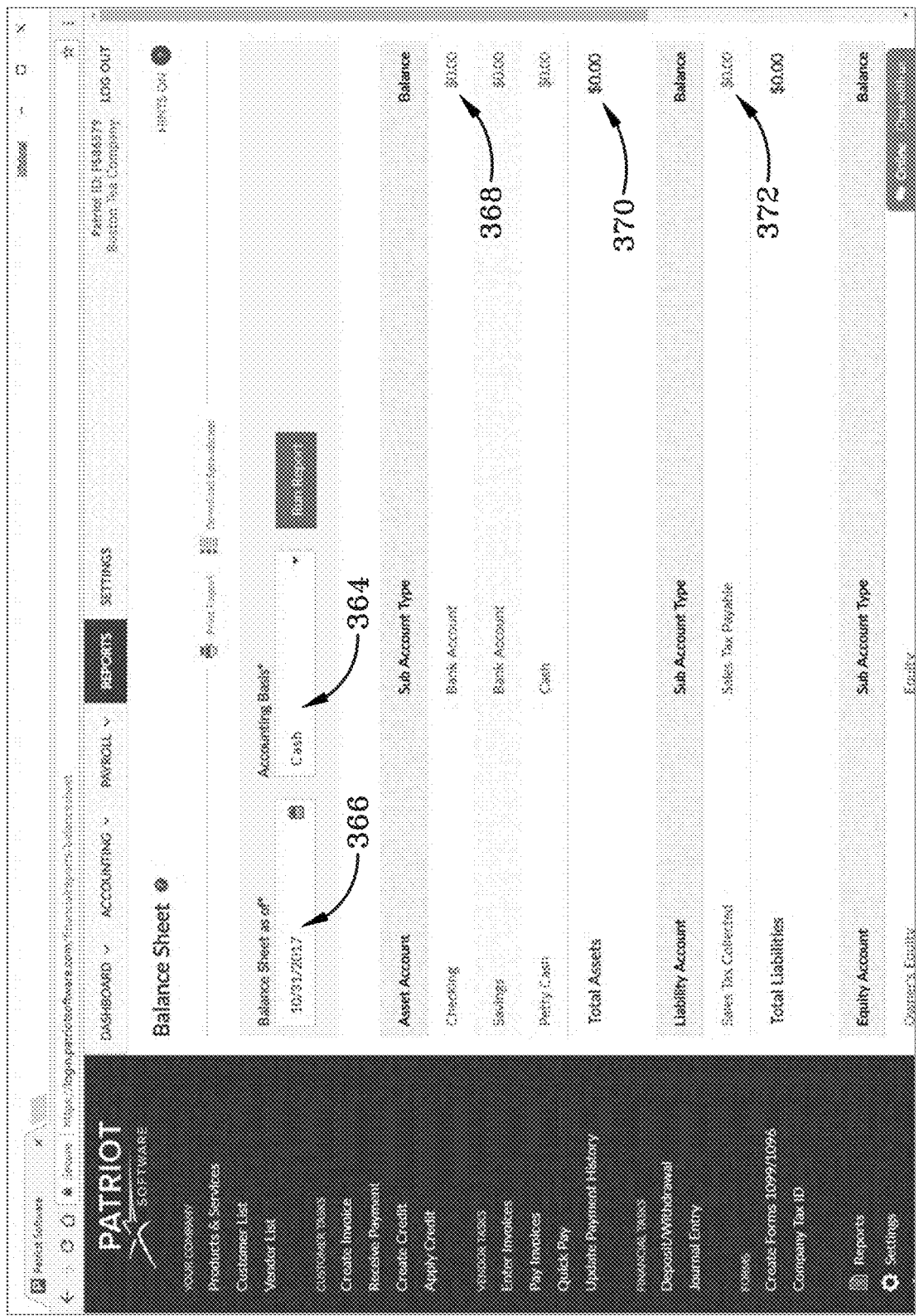
FIG. 19A is a screenshot of the balance sheet in cash basis view as of Oct. 31, 2017 in the accounting software.
Figure 19B:
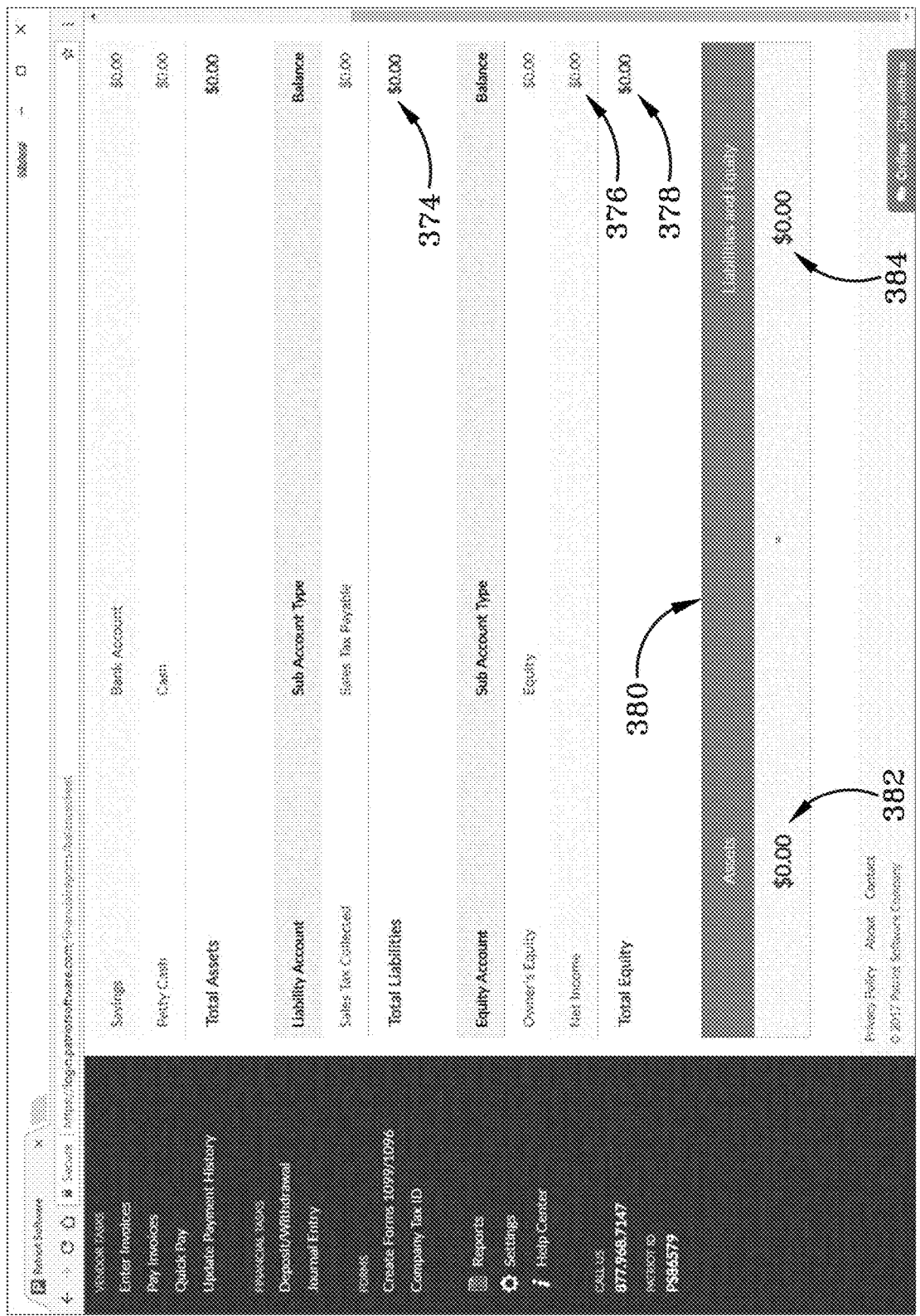
FIG. 19B is a screenshot of another portion of the balance sheet in cash basis view as of Oct. 31, 2017 in the accounting software.

FIG. 19A and FIG. 19B depict a balance sheet in a cash basis accounting view 364 as of Oct. 31, 2017 at 366. The checking account indicates a balance of $0.00 at 368, and because there are no other assets, the sum total of all asset accounts is $0.00 at 370. Sales tax collected is $0.00 at 372 as is the sum of all liabilities 374. Net income, as brought forward from 318 in the profit and loss statement in FIG. 14, is $0.00 at 376, making the sum total of equity $0.00 at 378. The balance sheet indicates a balance bar 380 that shows the assets equal the liabilities and equity. In this instance, the assets of $0.00 at 382 equal the liabilities and equity of $0.00 at 384.

Figure 20:
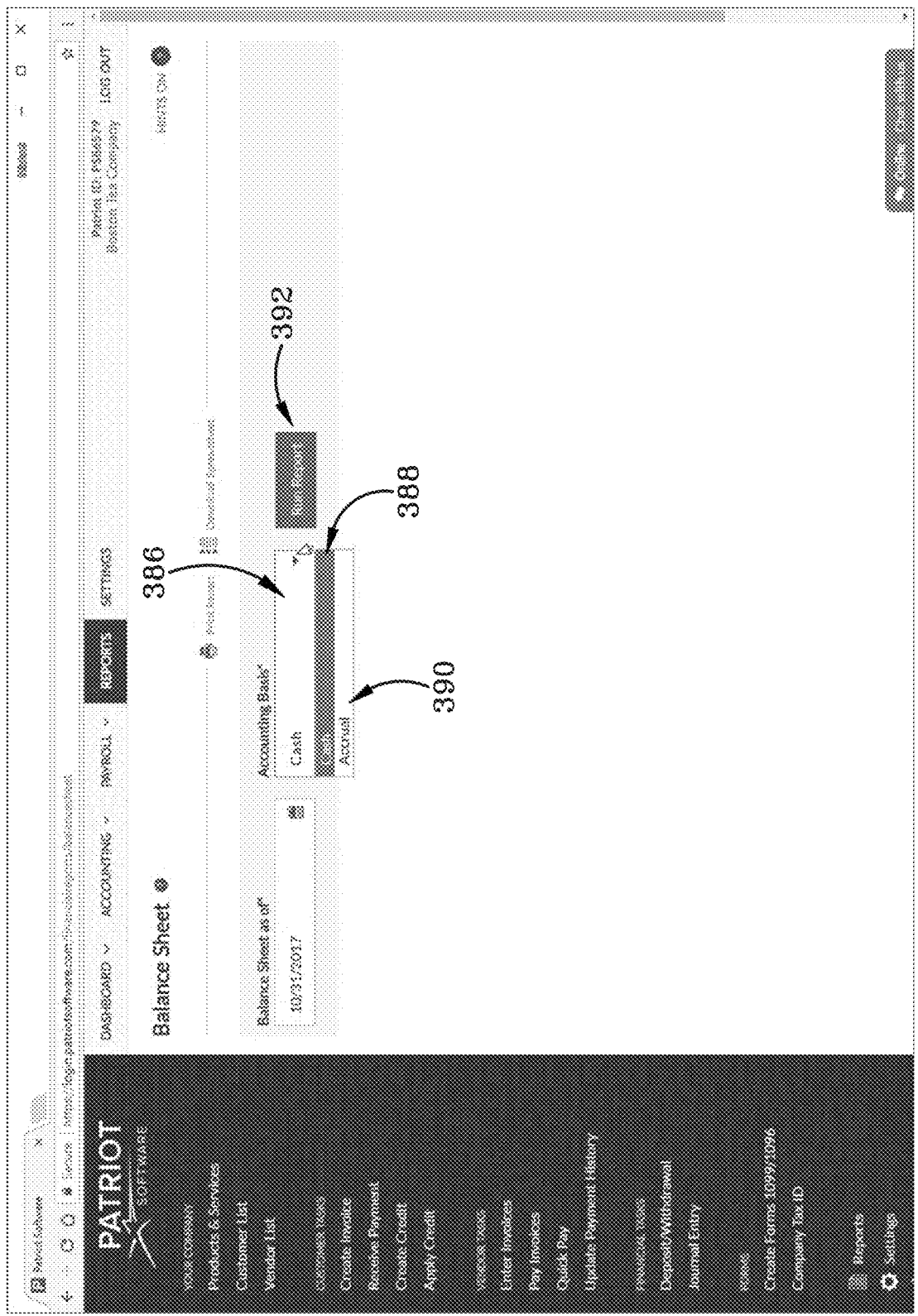
FIG. 20 is a screenshot showing the switching or toggling between the cash basis view and the accrual basis view of the balance sheet in the accounting software.

FIG. 20 depicts that the balance sheet can be toggled via box 386 between the cash basis view 388 and the accrual basis view 390. In order to view the balance sheet in an accrual basis, the dropdown menu 386 must be selected to accrual basis 390 and then a report run via execution call button 392.

Figure 21A:
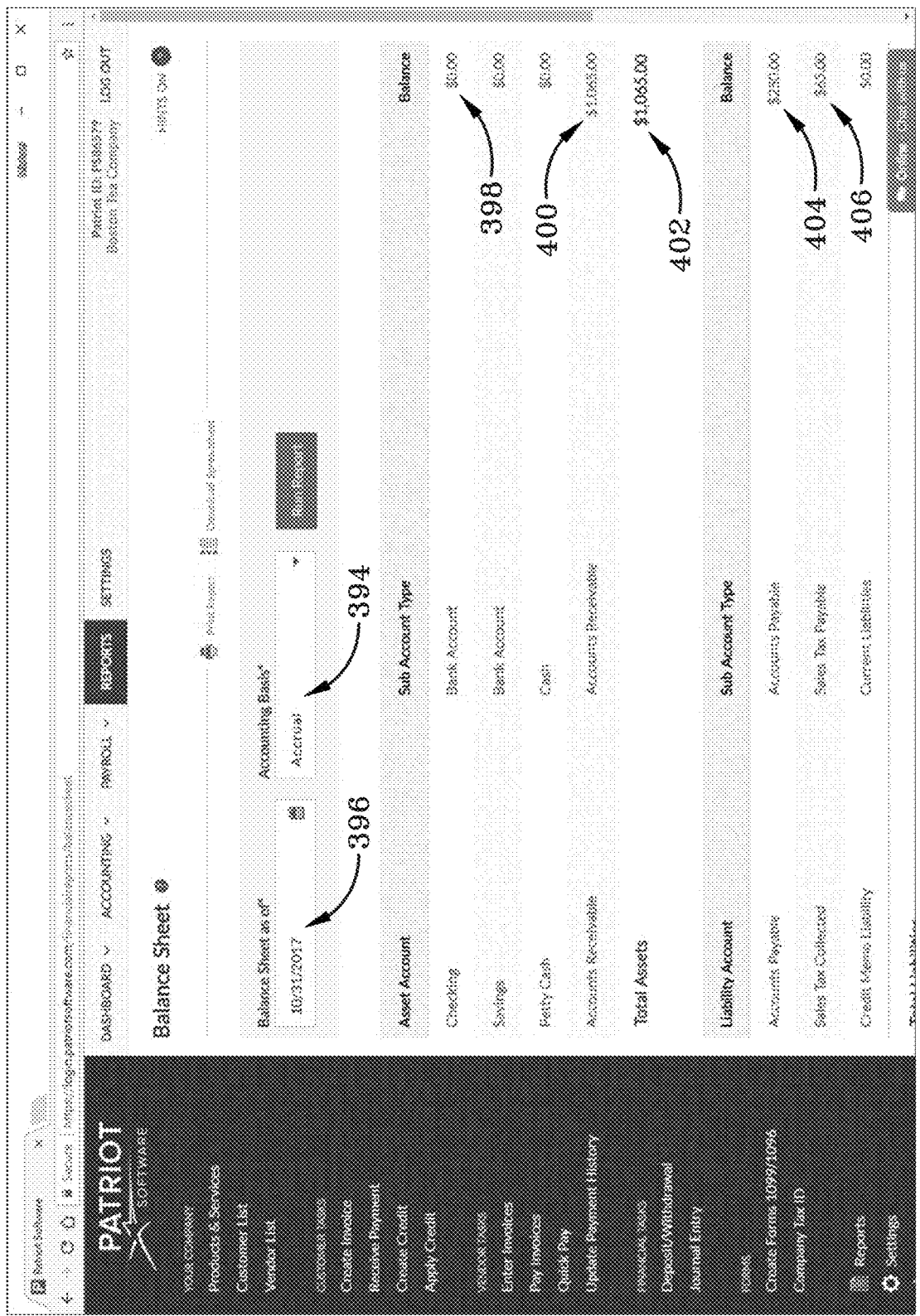
FIG. 21A is a screenshot of the balance sheet in accrual basis view as of Oct. 31, 2017 in the accounting software.
Figure 21B:
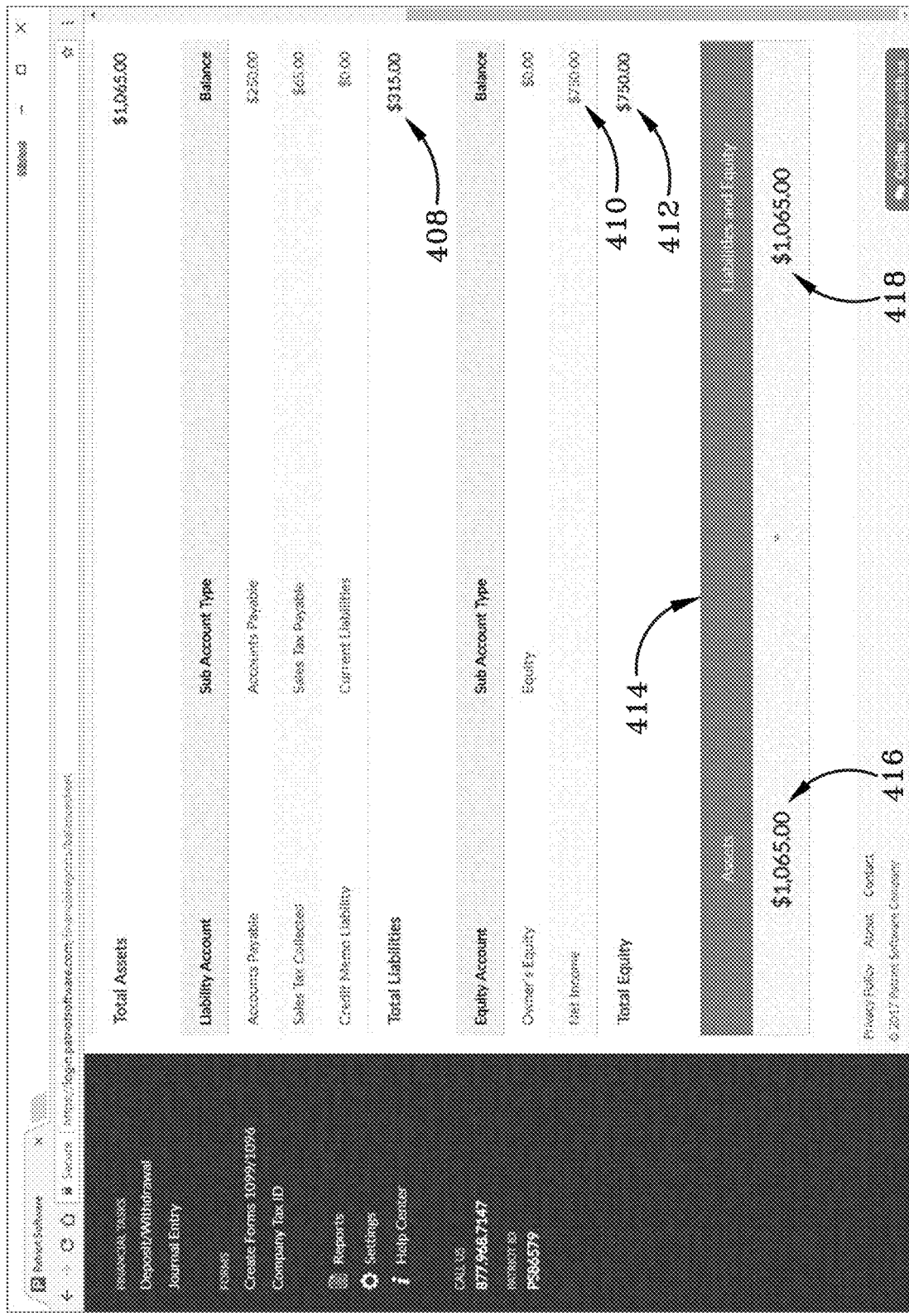
FIG. 21B is a screenshot of another portion of the balance sheet in accrual basis view as of Oct. 31, 2017 in the accounting software.

FIG. 21A and FIG. 21B depict a balance sheet in an accrual basis accounting view 394 as of Oct. 31, 2017 at 396. The checking account still indicates a balance of $0.00 at 398, but accounts receivable is now visible because the accrual view of the balance sheet has been selected. The accounts receivable indicates that $1,065.00 at 400 is due to be received from the invoice created in FIG. 9. The sum total of all asset accounts is now $1,065.00 at 402. Accounts payable is now visible as well and indicates that $250.00 at 404 is due to be paid for the vendor invoice created in FIG. 12. The sales tax collected in the accrual view is $65.00 at 406 and the sum total of all liabilities is now $315.00 at 408. Net income, as brought forward from 338 in the profit and loss statement in FIG. 16, is $750.00 at 410, making the sum total of equity $750.00 at 412. Even though no cash has changed hands, the accrual basis of accounting recognizes income when it is earned and expenses when they are incurred. Thus, the balance bar 414 now shows that the assets of $1,065.00 at 416 equal the liabilities and equities of $1,065.00 at 418.

Figure 22A:
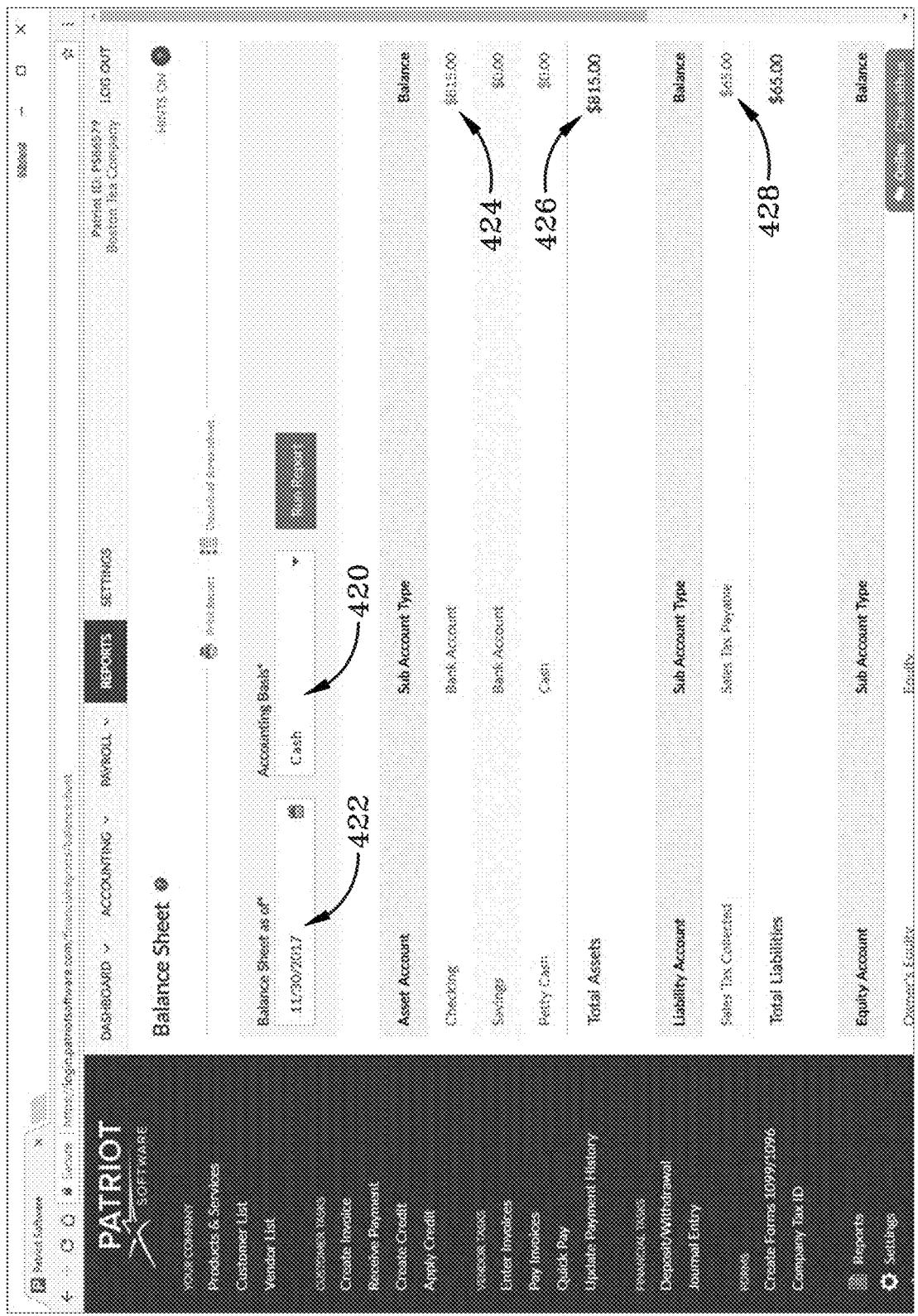
FIG. 22A is a screenshot of the balance sheet in cash basis view as of Nov. 30, 2017 in the accounting software.
Figure 22B:
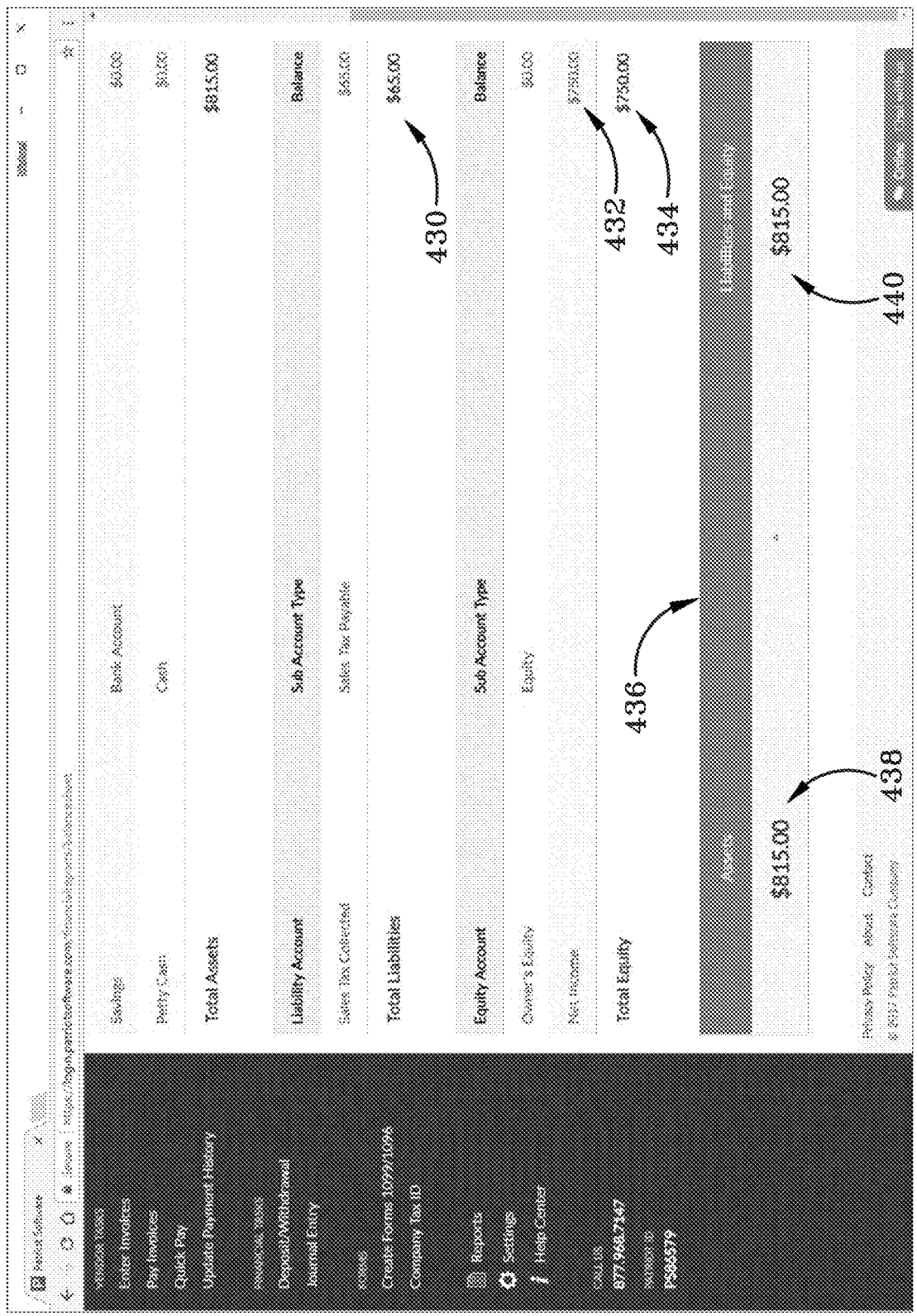
FIG. 22B is a screenshot of another portion of the balance sheet in cash basis view as of Nov. 30, 2017 in the accounting software.

FIG. 22A and FIG. 22B depict a balance sheet in a cash basis accounting view at 420 as of Nov. 30, 2017 at 422, one month after the balance sheet shown in FIG. 19A-19B. The checking account indicates $815.00 at 424 is the balance and, since there are no other assets, the sum total of assets is also $815.00 at 426. Sales tax collected is $65.00 at 428, which makes the sum total of liabilities $65.00 at 430. Net income, as brought forward from all prior cash basis profit and loss statements FIG. 14 at 318 and FIG. 17 at 350, of $750.00 at 432 is included in equity for a sum total equity of $750.00 at 434. The balance bar 436 now shows the assets of $815.00 at 438 equal the liabilities and equity of $815.00 at 440.

Figure 23A:
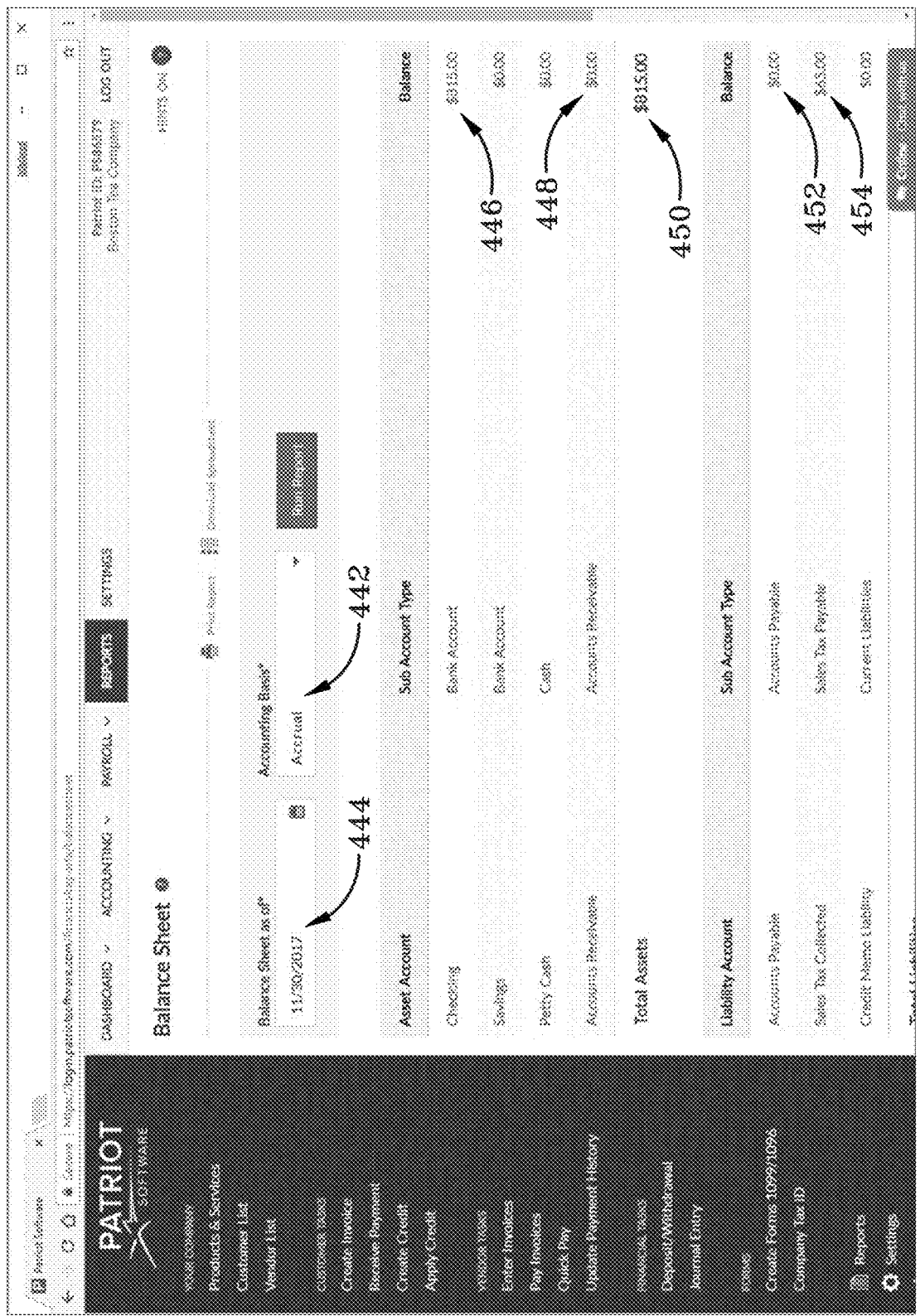
FIG. 23A is a screenshot of the balance sheet in accrual basis view as of Nov. 30, 2017 in the accounting software.
Figure 23B:
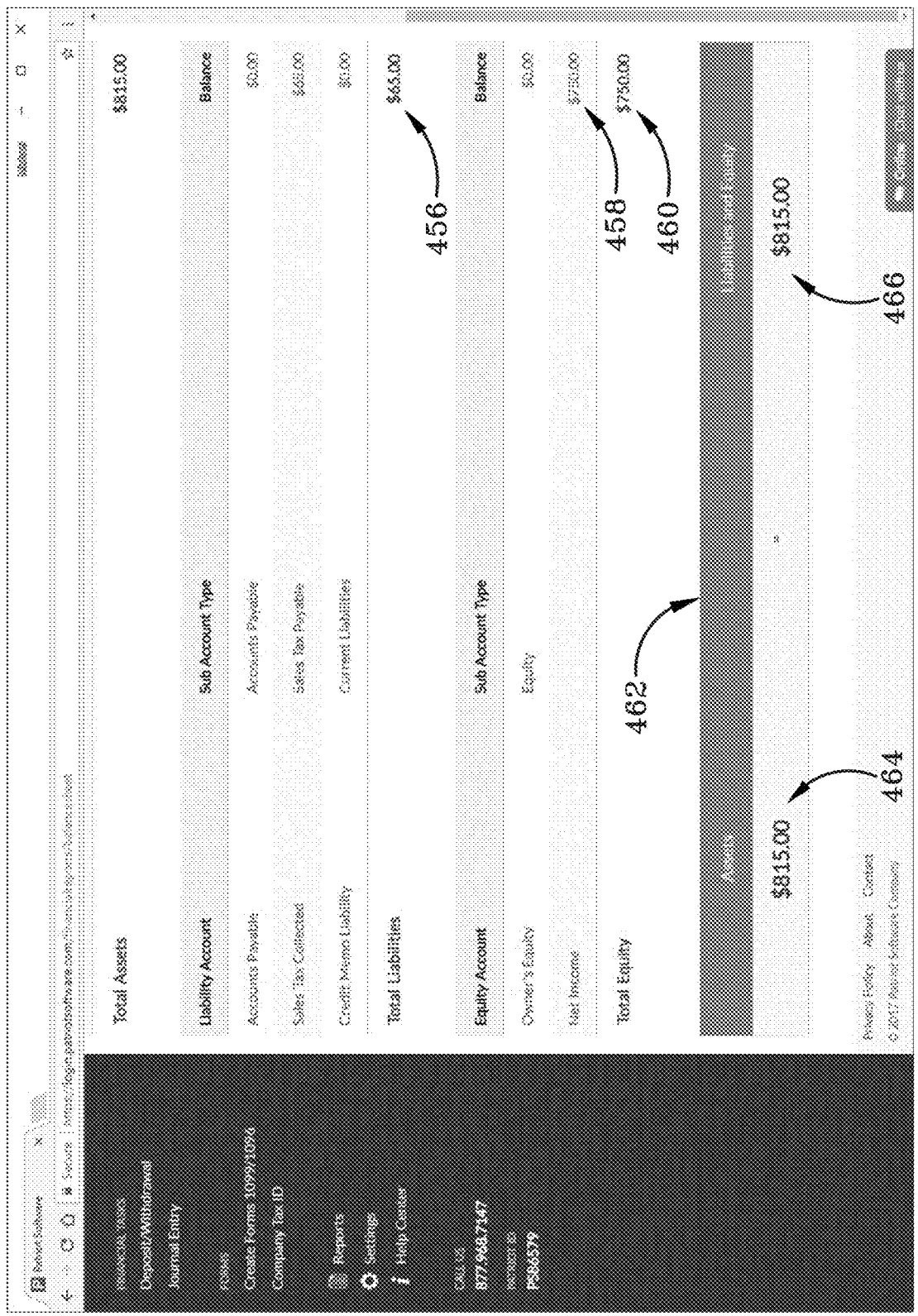
FIG. 23B is a screenshot of another portion of the balance sheet in accrual basis view as of Nov. 30, 2017 in the accounting software.

FIG. 23A and FIG. 23B depict a balance sheet in an accrual basis accounting view 442 as of Nov. 30, 2017 at 444, one month after the balance sheet shown in FIG. 21A and FIG. 21B. The checking account indicates $815.00 at 446 is the balance. Since this is the accrual view, accounts receivable is visible, but since full payment has been received for all customer invoices as of the report date, accounts receivable is $0.00 at 448, making the sum total of assets $815.00 at 450. Accounts payable is also visible, but has a balance of $0.00 at 452 because, as of the report date, all vendor invoices have been paid. Sales tax collected is $65.00 at 454 and the sum total of liabilities is $65.00 at 456. Net income, as brought forward from all prior accrual basis profit and loss statements FIG. 16 at 338 and FIG. 18 at 362, of $750.00 at 458 is included in equity for a sum total equity of $750.00 at 460. The balance bar 462 now shows the assets of $815.00 at 464 equal the liabilities and equity of $815.00 at 466. In this example, with the exception of which accounts are visible, the cash balance sheet for Nov. 30, 2017 FIG. 22A and FIG. 22B are identical to the accrual balance sheet for Nov. 30, 2017 FIG. 23A and FIG. 23B because the accrual basis balance sheet includes the balances brought forward from prior periods and the cash basis balance sheet now includes the customer and vendor payments that satisfied both the amounts due and the amounts owed.

The cash basis 102 method of accounting strictly prohibits using accrual accounts in the cash basis ledger. However, some operators may need to use accrual accounts yet also recognize their revenue and expenses in a cash basis manner. To accommodate these users, a hybrid of the cash basis 102 and accrual basis 106 methods of accounting, known as modified cash basis 104, may be offered. Modified cash basis differs from cash basis in that it allows the operator to view and use the accrual accounts that are hidden from operators who have selected cash basis. Further, modified cash basis allows the operator to create entries that include these accrual basis accounts in the cash basis ledger. Stated another way, operators who select the modified cash basis may see and use all of the accounts that accrual basis users see and use, and those accounts are used not only to make entries in the accrual ledger, but also in the cash ledger.

Figure 24:
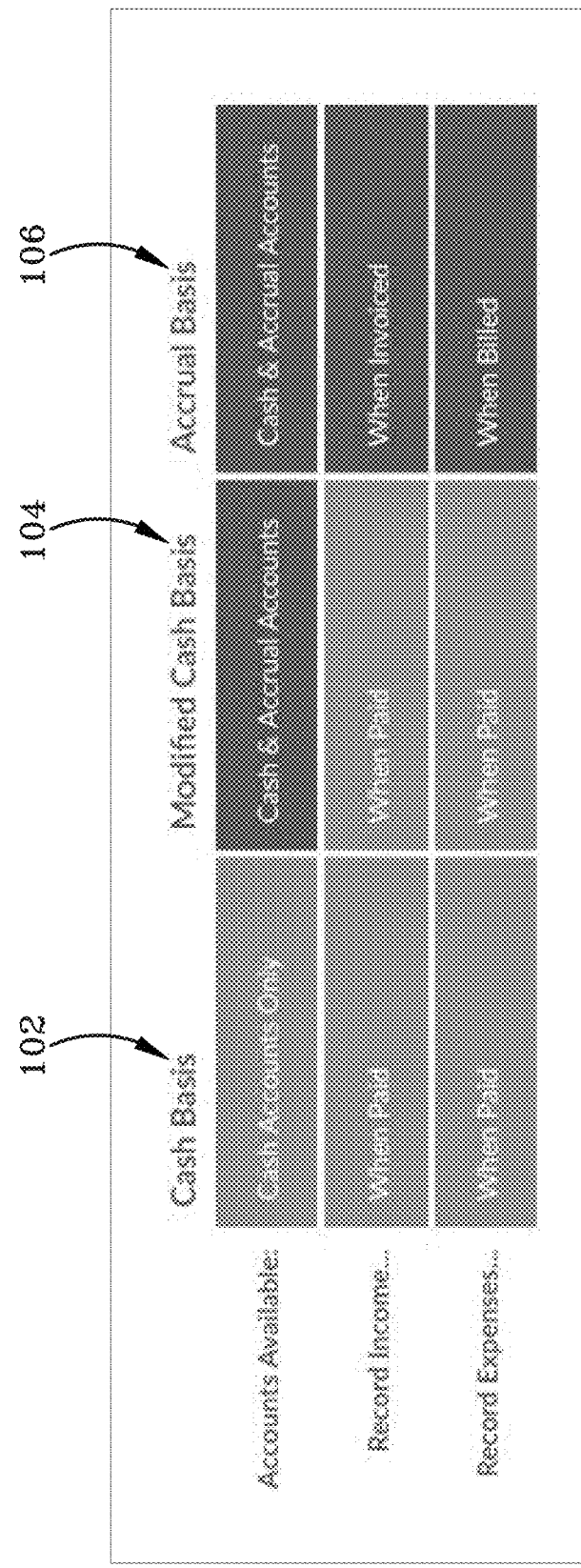
FIG. 24 is a screenshot of a matrix depicting ways in which cash basis, modified cash basis, and accrual basis differ from one another.

FIG. 24 depicts that, even though all accounts are visible in both accrual basis 106 and the modified cash basis 104, only a subset of the accounts are visible in cash basis 102. It is important to note that which accounts are available for use is the only way that modified cash basis 104 differs from cash basis 102. When modified cash basis is selected, revenue is still recognized in a cash basis manner.

The accounting software may further include a warning or flag that precludes or prevents a company from selecting cash basis 102 if accrual accounts are used in the cash ledger. This is done because cash basis accounting strictly prohibits the use of accrual accounts in the cash ledger. Once even a single entry with an accrual account has been added to the cash ledger, the operator is no longer eligible for cash basis and will need to use modified cash basis as an alternative. To ensure that cash basis may no longer be selected once accrual accounts have been used in the cash ledger, after the initial selection of modified cash basis 104 or accrual basis 106 is made as indicated in FIG. 2, the accounting software watches for new ledger entries that attempt to save entries that use accrual accounts into the cash basis ledger. When the operator attempts to make such an entry, a warning will rise indicating that if the user proceeds and saves the entry, they will no longer be eligible for cash basis and will only be able to choose between modified cash basis and accrual basis in the future. If the user proceeds and makes the entry, the accounting basis toggle switch eliminates the cash basis option 102 and displays only a modified cash basis option 104 and an accrual basis option 106.

In addition to the warning generated to warn the customer at the first terminal from selecting a cash basis methodology when accrual accounts are used in the first ledger, the system 1000 may further include logic to eliminate the viewing preference associated with cash basis and only display a modified cash basis option and an accrual basis option in response to the customer ignoring the warning.

Figure 25:
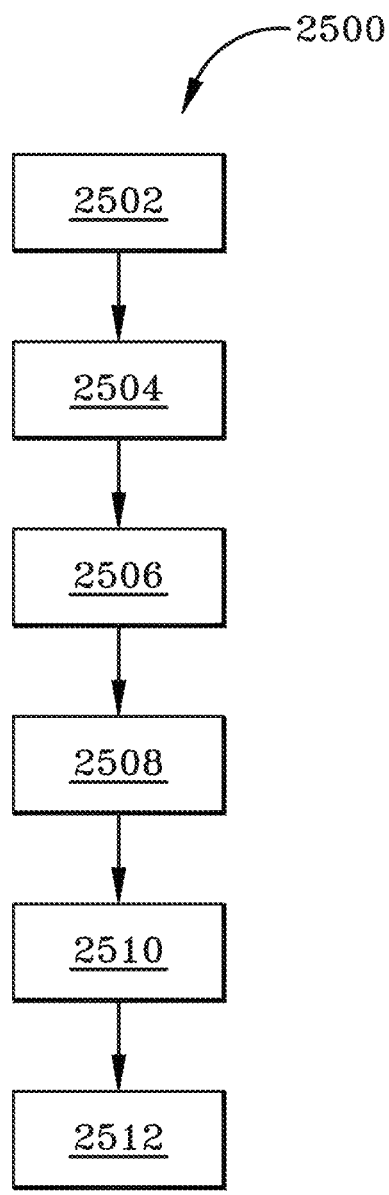
FIG. 25 is a flow chart of an exemplary method in accordance with an exemplary embodiment of the present disclosure.

FIG. 25 depicts an exemplary method in accordance with one aspect of the present disclosure generally at 2500. Particularly, method 2500 provides for switching accounting bases for accounting data viewed at the first terminal 12A linked with the second terminal 12B, both terminals having memory and a processor. The method 2500 may include receiving transactional data in the second terminal, which is shown generally at 2502. The method 2500 may further include recording the transactional data twice, wherein the transaction data is recorded in a cash basis first ledger and an accrual basis second ledger, which is shown generally at 2504. The method 2500 may further include responding to a first execution call of the first terminal by providing the first terminal the accounting data in a cash basis format from the first ledger, which is shown generally at 2506. The method 2500 may further include transferring, from the second terminal, the accounting data in a cash basis format from the first ledger, which is shown generally at 2508, and wherein the first ledger and the second ledger are independently maintained such that no modifying entries are needed. The method 2500 may further include responding to a second execution call of the first terminal by providing the first terminal the accounting data in an accrual basis format from the second ledger, which is shown generally at 2510. The method may include transferring, from the second terminal, the accounting data in an accrual basis format from the second ledger, which is shown generally at 2512, and wherein the first ledger and the second ledger are independently maintained such that no modifying entries are needed.

The method 2500 may further include responding to the first execution call generated in response to a virtual toggle switch being actuated at the first terminal. The method 2500 may further include responding to the second execution call generated in response to the virtual toggle switch being actuated in an opposite manner than what generated the first execution call. The method 2500 may further include generating the first ledger and the second ledger at the second terminal in response to a command entered at the first terminal. The method 2500 may further include responding to an invoice generated at the first terminal by recording accounting data from the invoice independently into both the first ledger and the second ledger. The method 2500 may further include responding, by the second terminal, to the first execution call by displaying accounting data in cash basis format in the first terminal; and responding, by the second terminal, to the second execution call by displaying accounting data in accrual basis format in the first terminal. The method 2500 may further include executing calculations, at the second terminal, for accounting entries entered at the first terminal; and responding, by the second terminal, to the first execution call by only displaying accounting data in cash basis format in the first terminal and not displaying the accounting data in accrual basis format in the first terminal at the same time. The method 2500 may further include responding, by the second terminal, to a switching preference entered at the first terminal, wherein the switching preference alters how the accounting data is viewed in the first terminal, and wherein switching preferences has no effect on the accounting data entered into the independent first and second ledgers. The method 2500 may further include responding, by the second terminal, to transactional data entered at the first terminal and stored on a remote cloud server. The method 2500 may further include sending a warning from the second terminal to the first terminal in response to an attempt at the first terminal to input accrual-based entries into the first ledger; and changing the first ledger from a cash basis format to a modified cash basis format subsequent to the first terminal ignoring the warning.

Figure 26:
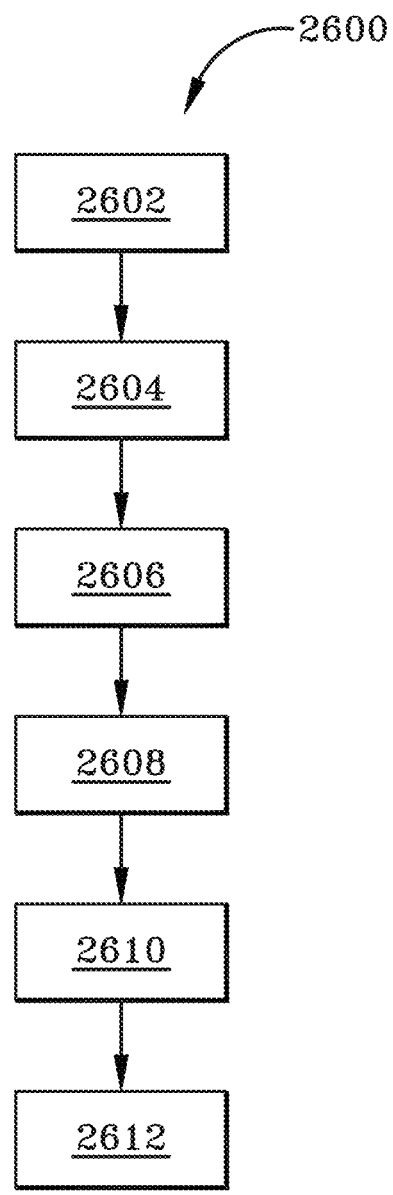
FIG. 26 is a flow chart of another exemplary method in accordance with another exemplary embodiment of the present disclosure.

FIG. 26 depicts another exemplary method 2600 for solving a computer centric problem in displaying accounting data by eliminating modifying entries when switching between a cash basis accounting ledger and an accrual basis accounting ledger. Method 2600 may include receiving transactional accounting data at a second terminal input from a first terminal remote from the second terminal, which is shown generally at 2602. Method 2600 may further include responding to the transactional accounting data at the second terminal by recording the transactional accounting data into a cash basis first ledger and an accrual basis second ledger, which is shown generally at 2604. Method 2600 may further include maintaining, independently, the first ledger and the second ledger at the second terminal, which is shown generally at 2606. Method 2600 may further include updating, independently, the first ledger and the second ledger at the second terminal in response to a single subsequent accounting transaction entered from the first terminal, which is shown generally at 2608. Method 2600 may further include responding to a first selection from the first terminal to switch a viewing preference of the transactional accounting data displayed in the first terminal from the first ledger to the second ledger, which is shown generally at 2610. Method 2600 may further include responding to a second selection from the first terminal to switch the viewing preference of the transactional accounting data displayed in the first terminal from the second ledger to the first ledger, which is shown generally at 2612, wherein when the viewing preference is switched at the first terminal, no modifying entries are calculated to effectuate the switch.

While the aforementioned methods take advantage of networked environments, it is possible for the SaaS method to operate entirely locally on a single computer, mobile device, or terminal. For example, a method may comprise: receiving transactional accounting data input at a terminal; recording the transactional accounting data independently into a cash basis first ledger and an accrual basis second ledger at the terminal; maintaining, independently, the first ledger and the second ledger at the terminal; updating, independently, the first ledger and the second ledger at the terminal in response to a subsequent accounting transaction input at the terminal; responding to a first selection at the terminal to switch a viewing preference of the transactional accounting data displayed at the terminal from the first ledger to the second ledger; and responding to a second selection at the terminal to switch the viewing preference of the transactional accounting data displayed at the terminal from the second ledger to the first ledger; wherein when the viewing preference is switched at the terminal, no modifying entries are calculated to effectuate the switch.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method for solving a computer centric problem for processing and recording accounting data that is to be selectively viewed at a first terminal linked with a second terminal, both terminals having memory and a processor, the method comprising:

receiving, in the second terminal, transactional data input at the first terminal;

recording the transactional data twice in the memory associated with the second terminal, wherein the transactional data is recorded in both a cash basis first ledger and an accrual basis second ledger;

generating first accounting data from the first ledger from the transactional data input and second accounting data from the second ledger from the transactional data input;

subsequent to recording the transactional data twice, responding to a first execution call from the first terminal by providing the first terminal a viewable format of the first accounting data in a cash basis format from the first ledger;

transferring, from the second terminal to the first terminal, instructions that enable the first accounting data in a cash basis format from the first ledger to be viewed in the first terminal;

subsequent to recording the transactional data twice, responding to a second execution call from the first terminal by providing the first terminal the second accounting data in an accrual basis format from the second ledger; and transferring, from the second terminal to the first terminal, instructions that enable the second accounting data in an accrual basis format from the second ledger to be viewed in the first terminal;

wherein the cash basis first ledger and the accrual basis second ledger are maintained independently such that each ledger contains the transactional data and no modifying entries are calculated when switching between the viewable format of the first accounting data and the viewable format of the second accounting data at the first terminal.

2. The method of claim 1, further comprising:

responding to the first execution call generated in response to a virtual toggle switch being actuated at the first terminal.

3. The method of claim 2, further comprising:

responding to the second execution call generated in response to the virtual toggle switch being actuated in an opposite manner than what generated the first execution call.

4. The method of claim 1, further comprising:

generating a first entry in the first ledger in the cash basis format and a second entry the second ledger in the accrual basis format at the second terminal in response to a request from the first terminal that a new transaction be created, wherein the first entry and the second entry are independent duplicate entries in each respective basis format.

5. The method of claim 1, further comprising:

responding to a transaction being updated at the first terminal by simultaneously updating transactional data in both the first ledger and the second ledger at the second terminal independently.

6. The method of claim 1, further comprising:

responding, by the second terminal, to the first execution call by causing the displaying of the first accounting data in cash basis format in the first terminal; and responding, by the second terminal, to the second execution call by causing the displaying of the second accounting data in accrual basis format in the first terminal.

7. The method of claim 1, further comprising:

executing calculations, at the second terminal, for accounting entries corresponding to the transactional data entered at the first terminal;

responding, by the second terminal, to the first execution call by causing the first terminal to only display the first accounting data in cash basis format and not display the second accounting data in accrual basis format at the same time.

8. The method of claim 1, further comprising:

responding, by the second terminal, to a switching preference entered at the first terminal, wherein the switching preference alters how the first and second accounting data is viewed in the first terminal, and wherein switching preferences has no effect on the accounting data entered into the independent first and second ledgers.

9. The method of claim 1, further comprising:

responding, by the second terminal, to transactional data entered at the first terminal and stored on a remote cloud server.

10. The method of claim 1, further comprising:

sending a warning from the second terminal to the first terminal in response to a request to enter a transaction that uses accrual entries in the cash basis ledger; and subsequent to the first terminal ignoring the warning, removing a restriction that prevents accrual accounts from being used in the first ledger.

11. A system comprising:

a first terminal in a computing environment associated with a customer;

a second terminal in a computing environment associated with a service provider, wherein the second terminal is network linked or internet linked with the first terminal to record transactional data twice in a storage medium associated with the second terminal to host the transactional data;

a cash basis accounting first ledger hosted by the second terminal that is selectively viewable at the first terminal; and an accrual basis accounting second ledger hosted by the second terminal that is selectively viewable at the first terminal, wherein the transactional data is recorded in both the first ledger and the second ledger, and wherein view selection of the first ledger and the second ledger is accomplished by a toggle switch at the first terminal after the transactional data has been recorded twice;

wherein the first ledger and the second ledger are maintained independently such that each ledger contains independent transactional data and no modifying entries are calculated when toggling the view selection that is adapted to solve a computer centric problem by improving computer processing and efficiency by eliminating the need to determine whether an entry is for a transaction between the cash basis accounting first ledger and the accrual basis accounting second ledger that are treated differently in a cash basis accounting system and an accrual basis accounting system.

12. The system of claim 11, further comprising:

an execution call generated at the first terminal in response to the customer actuating the toggle switch; wherein the execution call switches a display in the first terminal either (i) from the first ledger to the second ledger, or (ii) from the second ledger to the first ledger; wherein independent processing and storage of the first ledger and the second ledger enable the execution call to switch between ledger displays without the need for modifying entries to be generated.

13. The system of claim 11, further comprising:
a transaction entered at the first terminal that is sent across the network link or internet link to the second terminal; accounting data generated at the second terminal corresponding to the transaction recorded independently into both the first ledger and the second ledger.

14. The system of claim 11, wherein the storage medium is in the computing environment of the second terminal.

15. The system of claim 11, wherein the storage medium is on an internet-based cloud storage system.

16. The system of claim 13, further comprising:
a warning generated to alert the customer at the first terminal that attempting to make entries that use accrual accounts in the first ledger will necessitate the use of modified cash basis in place of cash basis.

17. The system of claim 16, further comprising:
logic to eliminate the viewing preference associated with cash basis and only display a modified cash basis option and an accrual basis option in response to the customer ignoring the warning.

18. The system of claim 17, further comprising:
wherein the logic reclassifies the first ledger to be a modified cash basis ledger after the viewing preference associated with the cash basis first ledger was eliminated.

19. A method comprising:
receiving transactional accounting data at a second terminal input from a first terminal remote from the second terminal;
evaluating the transactional accounting data at a second terminal and determining cash basis entries and accrual basis entries to be recorded;
recording the transactional accounting data twice at the second terminal by recording the transactional accounting data into both a cash basis first ledger and an accrual basis second ledger;
maintaining, independently, the first ledger and the second ledger at the second terminal;
updating, independently, the first ledger and the second ledger at the second terminal in response to subsequent accounting transactions entered from the first terminal;
subsequent to recording the transactional accounting data twice, responding to a first selection from the first terminal to switch a viewing preference of the transactional accounting data displayed in the first terminal from the first ledger to the second ledger; and
subsequent to recording the transactional accounting data twice, responding to a second selection from the first terminal to switch the viewing preference of the transactional accounting data displayed in the first terminal from the second ledger to the first ledger;
wherein when the viewing preference is switched at the first terminal, no modifying entries are calculated to effectuate the switch of the viewing preference of the transactional accounting data in the first ledger and the viewing preference of the transactional accounting data in the second ledger at the first terminal, wherein recording the transactional accounting data twice and independently into the cash basis first ledger and the accrual basis second ledger at the terminal is adapted to improve a computer centric problem by reducing processing time and power consumption at the second terminal.

20. A method comprising:
receiving transactional accounting data input at a terminal;
recording the transactional accounting data twice and independently into a cash basis first ledger and an accrual basis second ledger at the terminal;
maintaining, independently, the first ledger and the second ledger at the terminal;
updating, independently, the first ledger and the second ledger at the terminal in response to a subsequent accounting transaction input at the terminal;
subsequent to recording the transactional accounting data twice, responding to a first selection at the terminal to switch a viewing preference of the transactional accounting data displayed at the terminal from the first ledger to the second ledger; and
subsequent to recording the transactional accounting data twice, responding to a second selection at the terminal to switch the viewing preference of the transactional accounting data displayed at the terminal from the second ledger to the first ledger; wherein when the viewing preference is switched at the terminal, no modifying entries are calculated to effectuate the switch of the viewing preference of the transactional accounting data in the first ledger and the viewing preference of the transactional accounting data in the second ledger at the first terminal;
wherein recording the transactional accounting data twice and independently into the cash basis first ledger and the accrual basis second ledger at the terminal is adapted to improve a computer centric problem by reducing processing time and power consumption at the terminal.

21. The method of claim 20, further comprising:
toggling, selectively, a virtual toggle switch between the first selection and the second selection at the terminal.

22. The method of claim 20, further comprising:
displaying a cash basis accounting statement at the terminal in response to the first selection toggled by the virtual toggle switch; and
displaying an accrual basis accounting statement at the terminal in response to the second selection toggle by the virtual toggle switch.

23. The method of claim 22, further comprising:
displaying accounting data in only cash basis format or accrual basis format at the terminal at one time and not displaying the other basis of accounting data in cash basis format or accrual basis format at the terminal at the same time.

24. The method of claim 20, further comprising:
generating a warning in response to a request to enter a transaction that uses accrual entries in the first ledger; and reclassifying the first ledger to be a modified cash basis ledger in response to a command from the terminal to ignore the warning.

25. A system comprising:
a first terminal in a computing environment associated with a customer;
a second terminal in a computing environment associated with a service provider, wherein the second terminal is network linked or internet linked with the first terminal to record transactional data twice in a storage medium associated with the second terminal to host the transactional data;

a cash basis accounting first ledger hosted by the second terminal that is selectively viewable at the first terminal; and an accrual basis accounting second ledger hosted by the second terminal that is selectively viewable at the first terminal, wherein the transactional data is recorded in both the first ledger and the second ledger, and wherein view selection of the first ledger and the second ledger is accomplished by a toggle switch at the first terminal after the transactional data has been recorded twice;

wherein the first ledger and the second ledger are maintained independently such that each ledger contains independent transactional data and no modifying entries are calculated when toggling the view selection that is adapted to solve a computer centric problem by improving computer processing and efficiency of the second terminal by eliminating the need to: (i) calculate a modifying entry to convert the entry from accrual basis accounting to cash basis accounting, and then (ii) apply the calculated modification entry to the entry, and then (iii) create a modified balance sheet and modified income statement based on the modified entry.

\* \* \* \* \*